United States Patent [19]

Berkling

[11] Patent Number: 5,099,450
[45] Date of Patent: Mar. 24, 1992

[54] COMPUTER FOR REDUCING LAMBDA CALCULUS EXPRESSIONS EMPLOYING VARIABLE CONTAINING APPLICATIVE LANGUAGE CODE

[75] Inventor: Klaus J. Berkling, Fayetteville, N.Y.
[73] Assignee: Syracuse University, Syracuse, N.Y.
[21] Appl. No.: 247,622
[22] Filed: Sep. 22, 1988
[51] Int. Cl.[5] ............... G06F 9/30; G06F 9/302; G06F 9/38; G06F 13/00
[52] U.S. Cl. ............... 395/800; 364/916.2; 364/972; 364/972.2; 364/977; 364/977.1; 364/973; 364/DIG. 2
[58] Field of Search ... 364/200 MS File, 900 MS File

[56] References Cited

U.S. PATENT DOCUMENTS

| | | | |
|---|---|---|---|
| 3,646,523 | 2/1972 | Berkling | 364/200 |
| 4,075,689 | 2/1978 | Berkling | 364/200 |
| 4,310,880 | 1/1982 | Gehman | 364/200 |
| 4,447,875 | 5/1984 | Bolton et al. | 364/200 |
| 4,502,118 | 2/1985 | Hagenmaier, Jr. | 364/200 |
| 4,541,047 | 9/1985 | Wada et al. | 364/200 |
| 4,599,691 | 7/1986 | Sakaki et al. | 364/419 |
| 4,628,477 | 12/1986 | Burrows | 364/900 |
| 4,642,797 | 2/1987 | Hoberman | 365/221 |
| 4,734,848 | 3/1988 | Yamano et al. | 364/200 |
| 4,755,939 | 7/1988 | Watson | 364/200 |

OTHER PUBLICATIONS

Hilton, An Architecture For Reducing The Lambda Calculus CASE Center Technical Report No. 8715, Aug. 1987.
Berkling, Headorder Reduction: A Graph Reduction Scheme for the Operational Lambda Calculus, CASE Center Technical Report No. 8613, Nov. 1986.
Greene, A Fully Lazy Higher Order Purely Functional Programming Language with Reduction Semantics, CASE Center Technical Report No. 8503, Dec. 1985.
Stoye, The Implementation of Functional Languages Using Custom Hardware, a Dissertation Submitted for the Degree of Doctor of Philosophy in the University of Cambridge, May 1985.
Prini, An Efficient Interpreter for the Lambda Calculus, 23 Journal of Computer and System Sciences, 283-424, 1981.
Hommes, Kluge, Schlutter, A Reduction Machine Architecture and Expression Orientated Editing, Gesellshaft Fur Mathematik Und Datenverarbeitung mbH Bonn, 1980.
Wadsworth, Semantics and Pragmantics of the Lambda Calculus, Dissertation Submitted for the Doctor of Philosophy at the University of Oxford, 1971.
Goos & Hartmanis, Lecture Notes in Computer Science, Graph Reduction Proceedings of a Workshop, Sante Fe, NM, U.S.A., Sep./Oct. 1986, paper entitled Headorder Reduction: and Graph Reduction scheme for the Operational Lambda Calculus.

*Primary Examiner*—Thomas C. Lee
*Assistant Examiner*—Robert B. Harrell
*Attorney, Agent, or Firm*—Wall and Roehrig

[57] ABSTRACT

The invention is directed to a computer including an input unit, an arithmetic logic unit, a memory unit, a control unit, an output unit, and a signal bus system connected to each of the units to permit signal communication between each of the units. The control unit of the present invention includes a problem section coupled to the memory unit, for fetching binary encoded source elements of a problem expression stored in the memory unit. In addition, the control unit includes result generator, coupled to the problem section, for generating a result expression from at least one of the source elements of the problem expression. Further, the control unit comprises a transfer unit, coupled to the result generator and the memory unit, for storing the result expression into a result area of the memory unit. The result expression comprises a plurality of address pointers to pre-identified source elements of the problem expression. The control unit further comprises a reslut section, coupled to the memory unit, for fetching the result expression from the result area of the memory unit, writing unit, coupled to the result section and the memory unit, for writing the result expression into the environment area of the memory unit; environment section, coupled to the memory unit, for fetching the result expression from the environment area of the memory unit; and comparing unit, coupled to the memory unit, for comparing at least one storage location from the result area of the memory unit with at least one storage location from the environment area of the memory unit to monitor the storage capacity of the result area and the environment area.

12 Claims, 19 Drawing Sheets

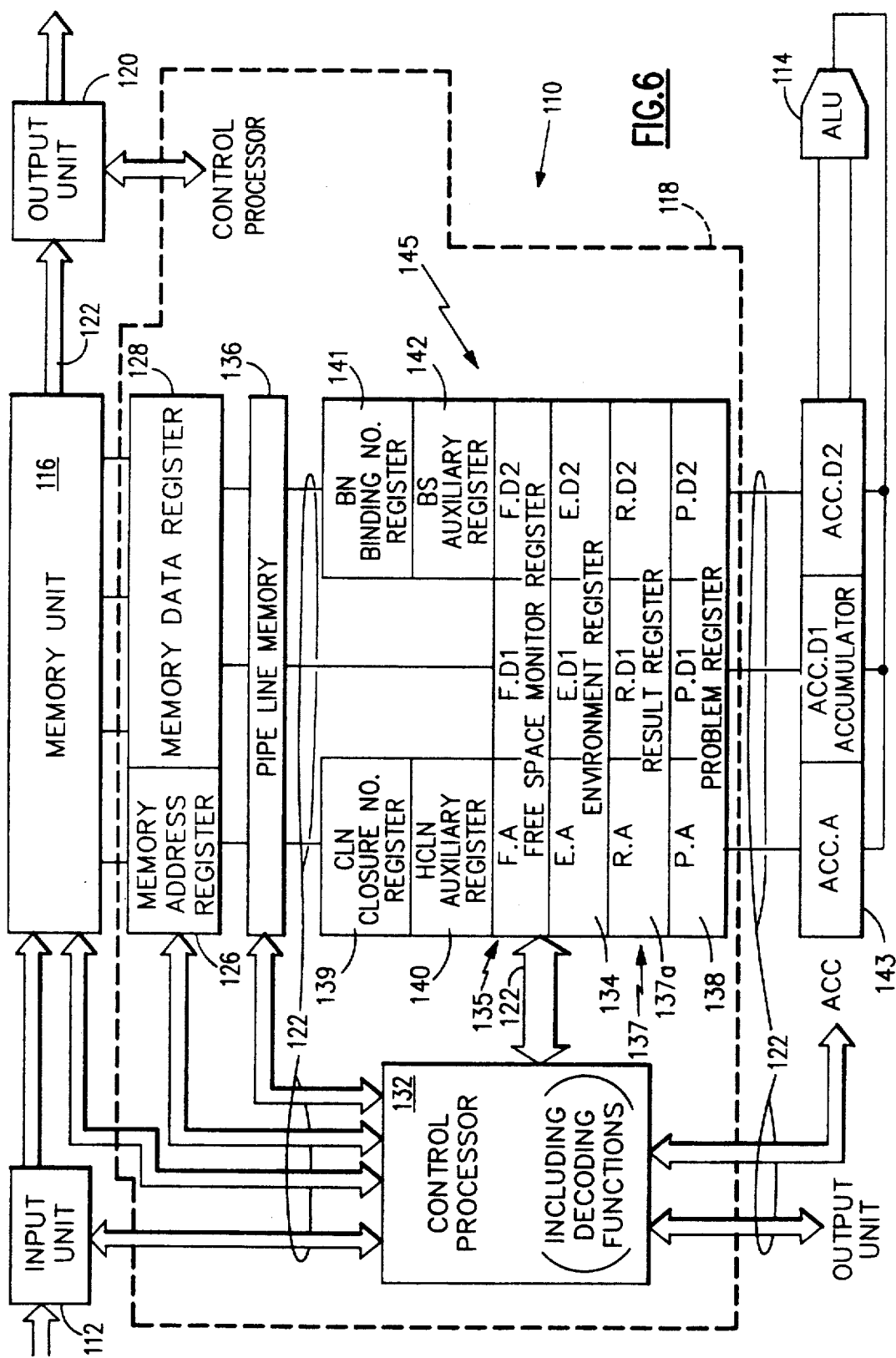

$$(\lambda x_1 \lambda x_2 \lambda x_3 \cdot ((x_1 x_2) x_3)(\lambda x_4 \cdot x_4))$$
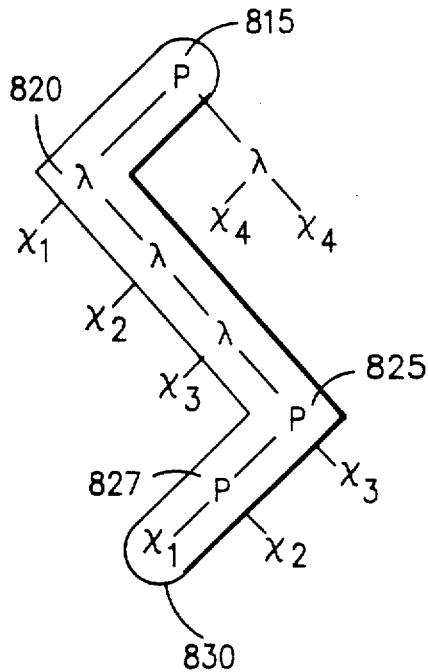
FIG.8
$$(\lambda \lambda \lambda \cdot ((2 \cdot 1) 0) (\lambda \cdot 0))$$
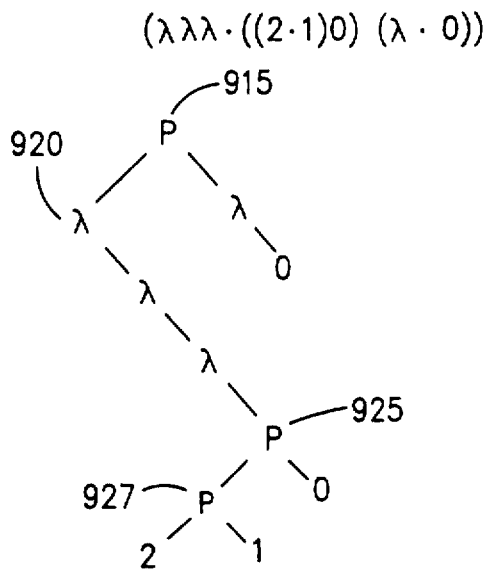
FIG.9
DATA STRUCTURE
| ADDRESS | ELEMENT TYPE | VALUE | DESCRIPTION |
|---|---|---|---|
| 0 | P | 5 | POINTER |
| 1 | λ | 3 | # OF LAMBDAS (BINDINGS) |
| 2 | P-VAR | 0 | VALUE OF VARIABLE |
| 3 | P-VAR | 1 | VALUE OF VARIABLE |
| 4 | VAR-HD | 2 | BINDING INDEX |
| 5 | λ | 1 | # OF LAMBDAS (BINDINGS) |
| 6 | VAR | 0 | BINDING INDEX |
FIG.10

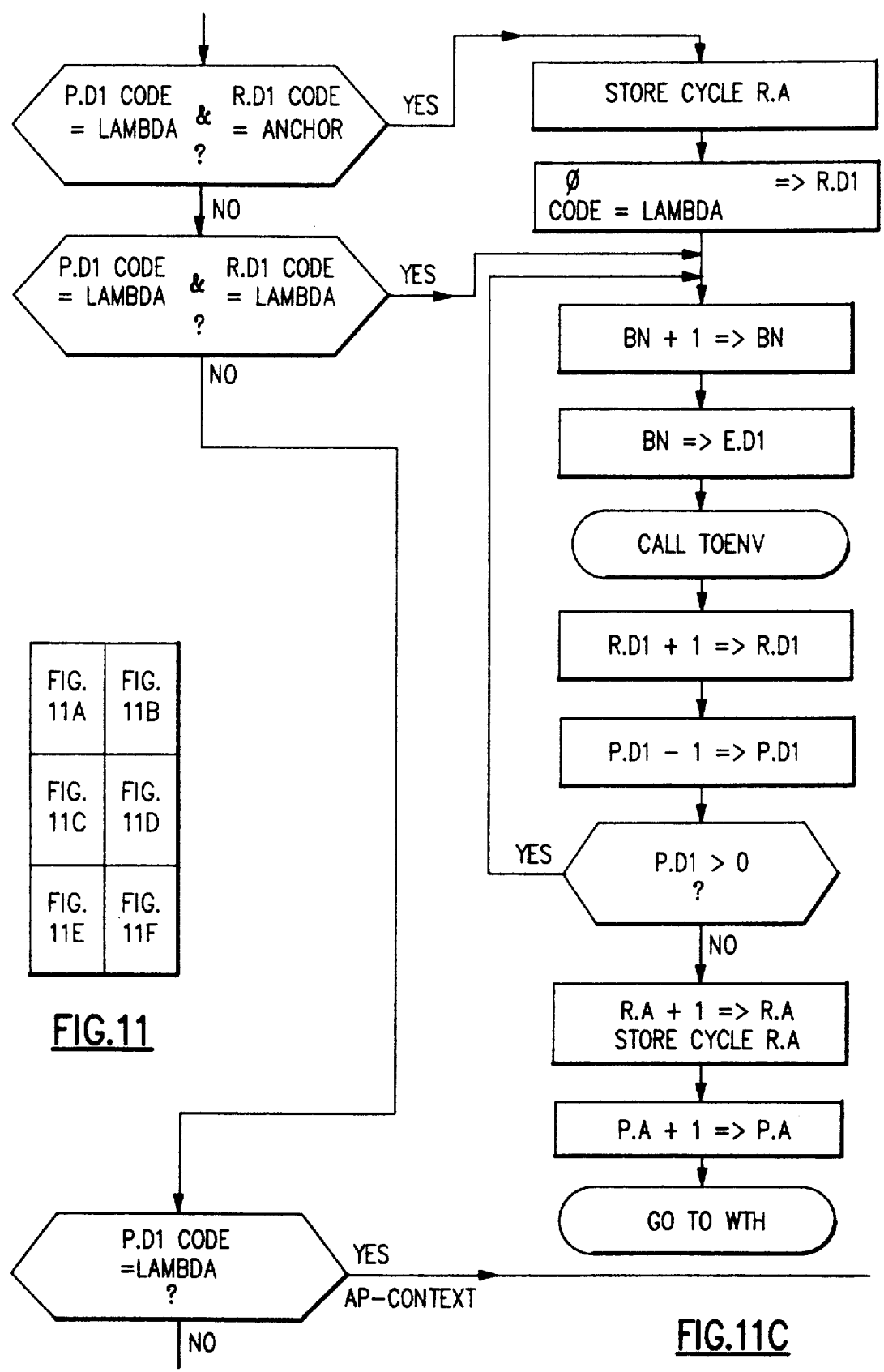

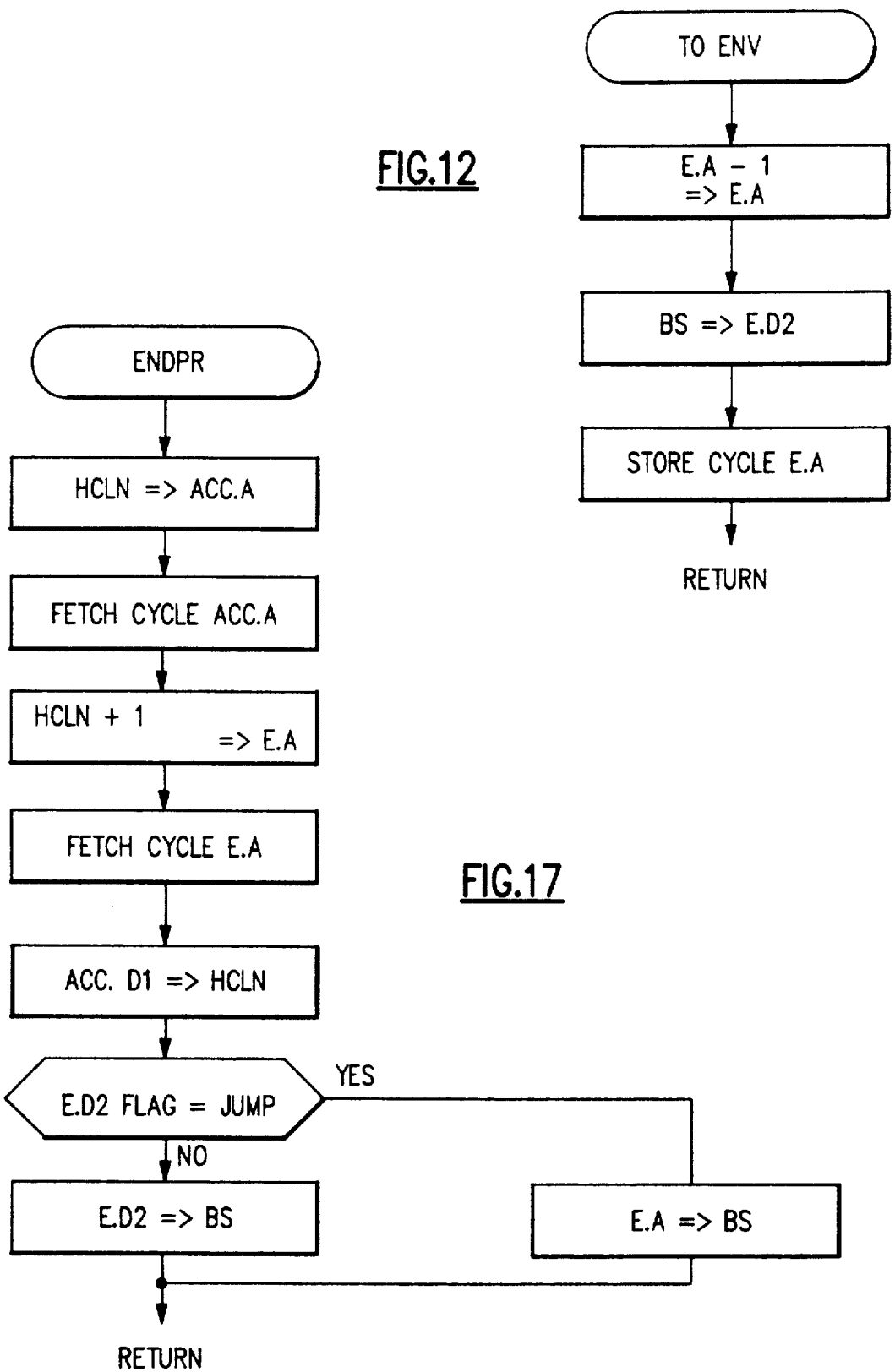

COMPUTER FOR REDUCING LAMBDA CALCULUS EXPRESSIONS EMPLOYING VARIABLE CONTAINING APPLICATIVE LANGUAGE CODE

BACKGROUND OF THE INVENTION

This invention relates to digital computing devices, and is more particularly directed to a non-von-Neumann type of computer, that is, one which does not employ a traditional means for executing a stored program. The invention is more specifically concerned with a lambda calculus computer which solves a problem stated as a linear representation of tree structures corresponding to expressions and computes a result based on the manipulation of the tree structure.

Conventional computers are uniformly of the von Neumann type, which rely on a program stored in memory which is executed under control of a program counter. According to the von Neumann principle, data and instructions are stored as bytes of binary data in identifiable memory cells in a random access memory. An arithmetic-logic unit performs logical operations (e.g., addition) on the data, based on the stored program instructions. These relate to fetching of the data between the respective memory cells to the arithmetic logic unit, and storing results in other memory cells in the memory.

Computer programming for von Neumann computers involves keeping track of a multitude of instructions and data and the memory locations in which they are stored, both before they are processed in the arithmetic-logic unit and thereafter. A minor error in the details of the program can lead to an inability to identify the specific locations in memory wherein large amounts of data and program instructions are stored. This problem can become quite manifest where there are complex branch programs, recursions, or the like. This inevitably requires extensive manual debugging of software.

In order to avoid the above problems with von Neumann type computers, it would be to advantage to start afresh and avoid the von Neumann stored program approach. In particular, it is to advantage to consider a lambda calculus approach to problem solving as a means to achieve speed and simplicity in the functioning of a computer.

Many abstract and theoretical calculating machines have been proposed to implement the lambda calculus as a machine language and to define its operational characteristics. None of these has been satisfactory, because the proposed system was incomplete, lacked certain necessary properties, such as reduction semantics, or led to implementations which were simply too inefficient to be a serious competitor to the von Neumann type computer. For instance, see D. A. Turner, "A New Implementation Technique for Applicative Languages", 9 Software Practice and Experience, 1979. Generally speaking, traditional user programs are difficult to translate into combinator expressions, and experience has shown that user programs transform into incomprehensible, more than linearly growing, very large combinator expressions, with the object code always being much larger than the source code.

Lambda Calculus was developed as a formal system of computation by Church. See A. Church, "The Calculi of Lambda Conversion," Annals of Mathematics Studies No. 6 Princeton University Press, 1941. An object of the present invention is to efficiently employ this formal system of computation as a machine code in a computer having a novel architecture for accommodating same. In this regard, systems have been proposed in L. Aiello and G. Prini, "An Efficient Interpreter for the Lambda Calculus", 23 Journal of Computer and System Sciences, 383-424, 1981.

An arbitrary Lambda Calculus expression may be represented in preorder as follows:

$$\lambda x_1 \ldots \lambda x_n P \ldots P\{x_j|\lambda_y \ldots\} e_m \ldots e_{lj}\ n,m \geq 0$$

$$m$$

This expression is described in detail by H. P. Barendregt in his book entitled "The Lambda Calculus, its Syntax and Semantics," North-Holland Publishing Co., Amsterdam, Netherlands, 1981, 1984

The arbitrary Lambda Calculus expression contains a sequence of n bindings (i.e., $\lambda x_i$; i is an integer, $0 \leq i \leq n$) followed by a sequence of m application nodes denoted by P, followed by what is referred to as the "head". The head can only be a variable or another Lambda expression. Following the head are m Lambda expressions of the same form just described.

The operational representation of Lambda expressions in a computer must be absolutely unique and safe; The possibility of confusion and collision of variable names cannot be tolerated. To avoid the possibility of confusion and collision, applicant employs a "binding indices" (also known as "De Bruijn indicies") method of representing the bound variables in the arbitrary expression. See N. G. De Bruijn, "Lambda-Calculus Notation With Nameless Dummies. A Tool For Automatic Formula Manipulation With Application to the Church-Rosser Theorem," *Indag. Math.*, Vol. 34 1972.

The binding indices method is described as follows:

a bound variable $x_i$ is represented by the number of Lambda bindings (i.e., $\lambda x_j$) located between it and its binding occurrence ($\lambda x_k$). For example, the Lambda expression:

$$(\lambda x_1 \lambda x_2 \lambda x_3 \cdot ((x_1 x_2) x_3)(\lambda x_4 \cdot x_4))$$

is written in its binding indice form as follows:

$$(\lambda\lambda\lambda \cdot ((2 1) 0)(\lambda \cdot 0))$$

The binding indices depend only on the structure of the Lambda expression and are completely implementation independent. However, this method of expression lends itself to the inventive implementation technique to be described herein.

The operational representation of the Lambda expression using binding indices is:

$$H \rightarrow \{\lambda^n P^m H A^m / \#\}; n > o, m \geq o$$

$$A \rightarrow \{\lambda^{n'} P^{m'} H A^{m'} / \#\}; n' \geq o, m' \geq o$$

where H is the head of the expression and the A's are the arguments.

All Lambda expressions of this representation may be expressed in the following form:

$$\lambda^* P^* \lambda^* P^* \lambda^* P^* \ldots P^* \#args^*$$

the symbol $\lambda^*$ represents a sequence of betas and the symbol $P^*$ represents a sequence of application nodes (aps), where (*) is an integer and may be equal to zero.

An arbitrary lambda expression may be represented in direct graph form. A sequence of bindings (λ*) is represented by a 45 degree line from upper left to lower right, and a sequence of aps by a 45 degree line from upper right to lower left. Therefore, a terse representation of an arbitrary lambda expression is graphically represented as a zigzag line, as shown in FIG. 1. A zigzag line representation suppresses the details of the arguments (A's) associated with the Lambda expression.

The employment of Lambda expressions as a system of computation requires that complex Lambda expressions be reduced to simplified equivalent forms which are called normal forms. Two reduction rules have been developed for simplifying complex Lambda expressions, they are:

(Beta-Conversion rule) B:(λx·M)N; B reduces to
[N/x]M where [N/x]M means the consistent replacement of N for all occurrences of x in M.

(Eta-Conversion rule) η: (λx·Mx);η reduces to M (if there are no free occurrences of x in M).

A Lambda expression is called reducible if it contains at least one instance of either a Beta conversion rule or an Eta conversion rule, which is called a "redex". An expression containing no redexes is said to be in "Normal Form." An expression following the form of the Beta-Conversion rule is referred to as a "beta redex", and one following the form of the Eta-Conversion rule is referred to as an "eta-redex".

Returning to the graphical representation of an arbitrary Lambda expression in FIG. 1, it is observed that the zigzag line structurally has a plurality of folds associated with it. In FIG. 1, the folds projecting to the right are called betas-aps and those projecting to the left are called aps-betas. The structure of these folds are illustrated in FIG. 2. The corner of an aps-betas is a beta-redex. The corner of the aps-betas of FIG. 2 contains the beta-redex:

(λa·M)Aa, where M may represent a Lambda expression.

A betas-aps fold does not contain a beta-redex, and therefore beta reduction cannot process this portion of the zigzag line. Thus, the zigzag line, or expression that it represents, will be smoothed out or transformed, into a single betas-aps graph, or equivalent expression by executing Beta-Conversions. A transformation technique that accomplishes this objective is referred to as "beta reduction-in-the-large".

Beta reduction-in-the-large can be described in terms of the graphical representation of an arbitrary Lambda expression. An aps-betas fold is cut from the zigzag line and moved down the zigzag. This graph manipulation does not change the meaning (i.e., an equivalence preserving transformation) of the zigzag as long as a copy of the cutout aps-betas fold is inserted, as a prefix, before all of the arguments pending from a sequence of aps located between the original and final positions of the cutout.

Beta reduction-in-the-large is illustrated in FIG. 3. The cut C—C in FIG. 3 is concerned with a maximum possible aps-betas groupings in the first occurring aps-betas fold of the zigzag line. The letters a through r denote generally arguments and variables ordinarily pending from an arbitrary Lambda expression graph.

The graph on the right in FIG. 3 illustrates that in the transformation, the cut C—C has been moved down the zigzag line to the farthest possible position, before the bindings q and r. In addition, the cut C—C has to be inserted before all depending arguments from k to p. This insertion is denoted by underlining in FIG. 3, except for argument m where the insert cut is explicitly shown as an example.

In the example of FIG. 3, the betas are exhausted before the aps. An example where the aps are exhausted before the betas is shown in FIG. 4. In this case, before a transformation is performed, an extension of cut C—C is made, as shown in FIG. 4 as cut D—D. This technique is called "eta extension in-the-large", and is graphically accomplished by inserting the new betas-aps $\overline{j'k'}$ k*j* in the zigzag line. Eta-extension is the application of the Eta-Conversion rule in reverse. Eta-extension in-the-large is a repeated application of the Eta-Conversion rule in reverse.

As can be seen from FIG. 3 and FIG. 4, the application of beta reduction in-the-large combined with eta-extension in-the-large, where appropriate, transforms an arbitrary zigzag line into a single betas-aps-betas-#-args graph.

The betas-# portion of the transformed expression operates as a selector function and is of the form:

$$\lambda x_1 \lambda x_2 \ldots \lambda x_n \cdot x_m = \left| \begin{array}{c} m \\ 1 < m < n \\ n \end{array} \right.$$

The transformed expression therefore represents the application of the selector function to the arguments (args) of the transformed expression, yielding the selected mth argument:

$$(\lambda x_1 \lambda x_2 \ldots \lambda x_n \cdot x_m) a_1 a_2 \ldots a_n \rightarrow a_m$$

This property of the transformed expression is conceptually equivalent to a look-up table in a data environment. The environment may be implemented as an array with index m accessing the appropriate location containing a pointer to the argument. The argument am may be a constant, variable, symbol or an expression. If it is an expression we obtain again, an arbitrary zigzag line and the procedure of applying beta reduction in-the-large and eta extension in-the-large is repeated for that new expression.

If the argument a is a variable, then the resulting transformed expression is a single betas-aps graph terminating in a variable. This resulting skeleton structure has the important property that it will not be altered by later transformation, no matter what reduction sequence takes place in the arguments pending to the right of the zigzag line (from the aps). Moreover, these arguments are independent from one another, i.e., no conversion rule will cause any two of these arguments to interact. Thus, this independence suggests an implementation whereby the order in which the argument is reduced does not affect the overall result; and the reduction of these arguments may be performed concurrently.

The reduction method herein described is termed "head order" reduction. It is closely related to the "head normal form" method as described in C. P., Wadsworth, Semantics and Pragmatics of the Lambda Calculus, Sept. 1971, PhD. Thesis, Univ. of Oxford, and the "Lazy Normal form" method as described by K. J. Greene, A Fully Lazy Higher Order Purely Functional Language with Reduction Semantics. CASE Center Technical Report No. 8503, Syracuse University.

A finished transformed expression, after selector operation (or lookup), is in the form of a betas-aps-index, i.e., a sequence of betas followed by a sequence of applications ending in a number that represents a bound variable. As indicated above, the arguments pending from this transformed expression are independent of one another and therefore can be reduced concurrently. This is possible if a copy of the appropriate environment is attached to each of the arguments. By virtue of the transformation technique, including beta reduction and eta reduction in-the-large, the appropriate environment is already attached to the arguments as prefixes.

The prefix portion of the augmented arguments can be conveniently represented as a pointer into one shared environment. An advantageous implementation performing the reductions on the arguments sequentially or concurrently would attempt to preserve this sharing property. Since environments expand and shrink, a naive sharing arrangement would lead to corruption if several arguments share a single environment. To solve this problem, an implementation approach must include proper control over the shrinking or cutting back of the environment.

A lambda calculus computer has been proposed previously by the same inventor in U.S. Pat. No. 3,646,523. That computer was intended for use with a new formal machine language based on the lambda calculus. In the computer, an input channel breaks up input data into character strings, a device assigns these strings into memory locations in a linear memory, and an associative memory, or "tablet" stores the character strings. The tablet assumes the program in the form of a tree, and accordingly includes an array of high-speed registers, with the nodes of the tree being given by some program corresponding to rows in the tablet and with the branches that extend from the nodes corresponding to tablet columns. The tablet addresses are accessed using associative techniques, and so the tablet is connected with input/output units and other devices to serve as a central communications device.

Another proposal is contained in this inventor's U.S. Pat. No. 4,075,689, which deals with a computer system adapted for reduction language, i.e., lambda calculus or combinators. That computer system employs stack registers to define sets of memory locations where expressions stored therein as strings can be shifted up or down. Access to a processor is provided to the memory cells at the top of the registers. The top cells of the registers are tested for instances of reduction rules, and reduction is carried out, if appropriate. The computing process takes place in such a manner that the reduction processor performs state transitions on the top cells of the registers, several times if necessary. This process is called string reduction. Because of its intrinsic structure, it is too inefficient for present day computing requirements.

It can be seen that neither of these schemes involves the use of a shared environment, and so there are no means provided to address an environment sequentially, or to monitor the free space available as the environment grows and shrinks.

General background on the logic and protocol of a lambda calculus reduction machine are contained in Ferdinand Hommes, "How to Use the Reduction Machine", Gesellshaft fr Mathematik und Datenverarbeitung MbH Bonn, Mar. 23, 1977.

OBJECTS AND SUMMARY OF THE INVENTION

It is an object of the present invention to provide a computing machine which employs the lambda calculus as a machine code, and which avoids the drawbacks of the prior art.

It is a more specific object of the present invention to provide a computer that eliminates the necessity of software implementation of lambda calculus, and thereby minimizes the possibility of programming errors.

It is another object of the present invention to provide a fast and efficient hardware implementation of a computing machine based on functional languages employing lambda calculus.

It is yet another object of the present invention to implement a lambda calculus computing machine employing the conceptual elements of the von Neumann architecture.

These and other objects of the present invention are attained by a lambda calculus computing machine, that includes an input unit, an arithmetic-logic unit, a memory unit, a control unit, an output unit, and a signal bus system connected to each of said units to permit signal communication between each of said units.

The input unit comprises a device for encoding a plurality of source elements into a plurality of respective binary words. The source elements represent components of an arbitrary lambda expression and may be of the type including a lambda, an application, or a variable. This expression represents a problem to be solved by the lambda calculus computing machine. The input unit also includes a means for loading the encoded binary words into respective storage locations in the memory unit.

The output unit comprises means for retrieving stored binary words from said memory unit and means for decoding said retrieved binary words for output.

The control unit of the inventive computer comprises a problem means for fetching the binary encoded source elements of the problem expression from the memory unit; a means for generating a result expression from at least one of the source elements of the problem expression; a means for storing the result expression into a result area of the memory unit, the result expression comprising a plurality of address pointers to pre-identified source elements of the problem expression; a result means for fetching the result expression from the result area of the memory unit; a means for writing the result expression into an environment area of the memory unit; an environment means for fetching the result expression from the environment area of the memory unit; and a means for comparing the largest available storage location from the result area of the memory unit with the smallest available storage location from the environment area of the memory unit to monitor the storage capacity of the result area and the environment area. If these compared storage locations are equal, the computing limits of the machine have been reached.

The lambda calculus computing machine operates in at least three basic modes. In a first mode, the problem expression is read from the memory unit, a result expression is generated therefrom, and the result expression is written into the result area of the memory unit as a sequence of pointers to arguments. The computer operates in this mode until the problem means fetches either a lambda or a variable type source element (as opposed to a pointer to an argument expression).

Upon detection of a lambda type source element, the computer switches to a second mode. In the second mode, the result expression is read from said result area of said memory unit as a sequence of pointers, and written to the environment area of the memory unit, also as a sequence of pointers. The computer operates in this mode until a predetermined number of binary words (as prescribed by the value of the lambda element detected) are written into the environment area from the result area, after which the computer switches back to the first mode.

Upon detection of a variable type source element the computer switches to a third mode. In the third mode, the variable type source element acts as an index into the environment area of the memory unit such that an address location in the memory unit can be computed where a pointer to an argument expression is stored. The pointer is then substituted for the variable element. If the variable element is an argument itself, the retrieved pointer simply replaces the variable.

The problem means, result means, and environment means may be realized as a set of instruction counters and instruction decoders with the following properties: the instruction counters count up and also count down; they read and also write sequentially; they switch control from one to the other according to the instruction they read, they do single steps and multiple steps directed by the contents of registers they set, while cooperating in generating a lambda expression in the result area from the lambda expression in the problem area which is equivalent with respect to the beta and eta reduction rules of the lambda calculus.

BRIEF DESCRIPTION OF THE DRAWINGS

One way of carrying out the invention is described in detail below with reference to the drawings which illustrate three specific embodiments, in which:

FIG. 6 illustrates a schematic diagram of a second embodiment of the lambda calculus computing machine according to the present invention;

FIG. 8 is a graphical representation of a lambda calculus expression presented as an example;

FIG. 9 is a graphical representation of the expression of FIG. 9 in binding indices form;

FIG. 10 is a table showing the data structure corresponding to the graph of FIG. 8.

FIGS. 11A, 11B, 11C, 11D, 11E, and 11F are flow diagrams of the central control function of the lambda calculus computing machine illustrated in FIG. 5, referred to as WTH.

FIG. 12 is a flow diagram of a control function of the computing machine illustrated in FIG. 5, referred to as TOENV.

FIG. 17 is a flow diagram of a control function of the computing machine illustrated in FIG. 5, referred to as ENDPR.

DETAILED DESCRIPTION OF THE PREFERRED EMBODIMENT

Figure 1:
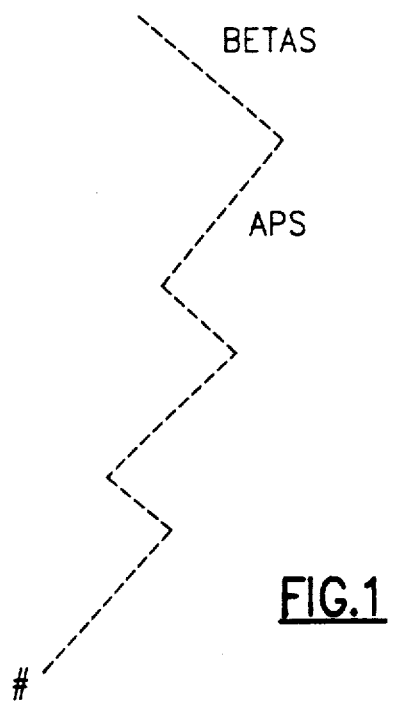
FIG. 1 is a graphical representation of an arbitrary lambda expression in the form of a zigzag line.
Figure 2:
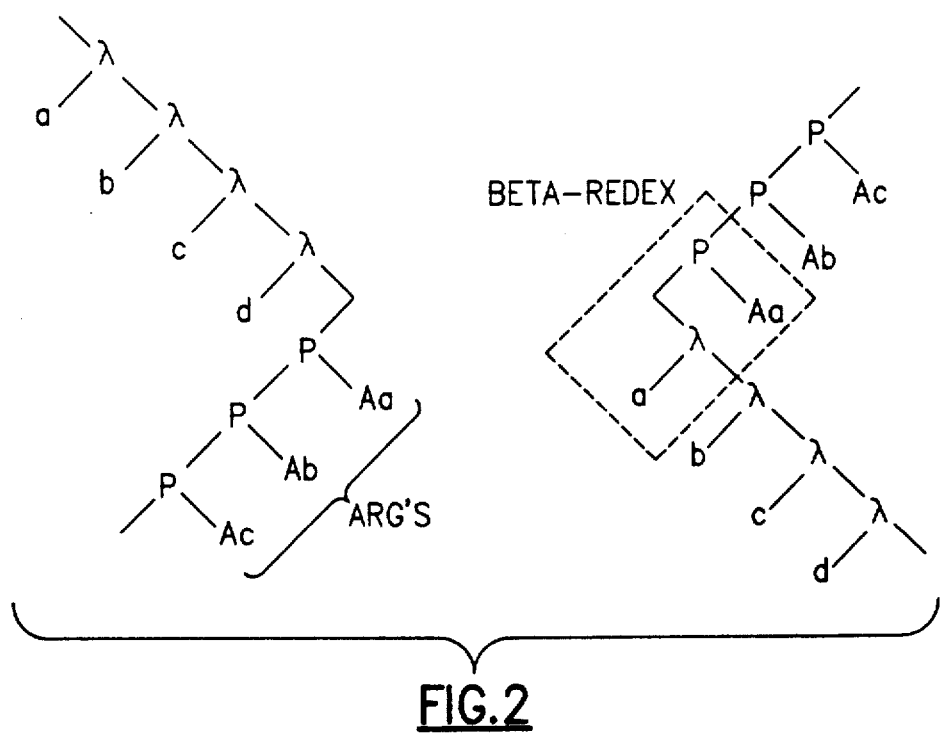
FIG. 2 is a detailed view of betas-aps and aps-betas structures.
Figure 3:
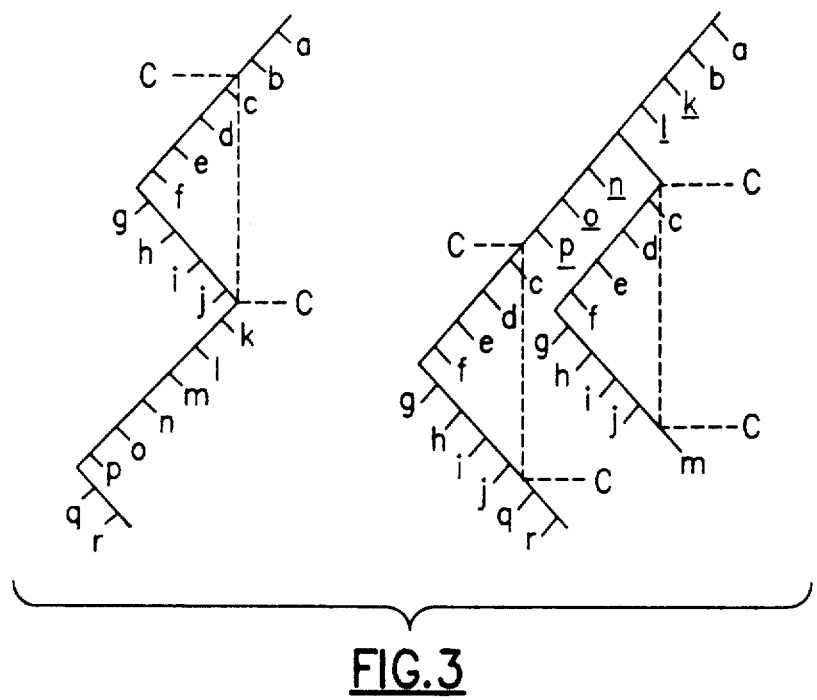
FIG. 3 is a graphical representation of beta reduction in-the-large.
Figure 4:
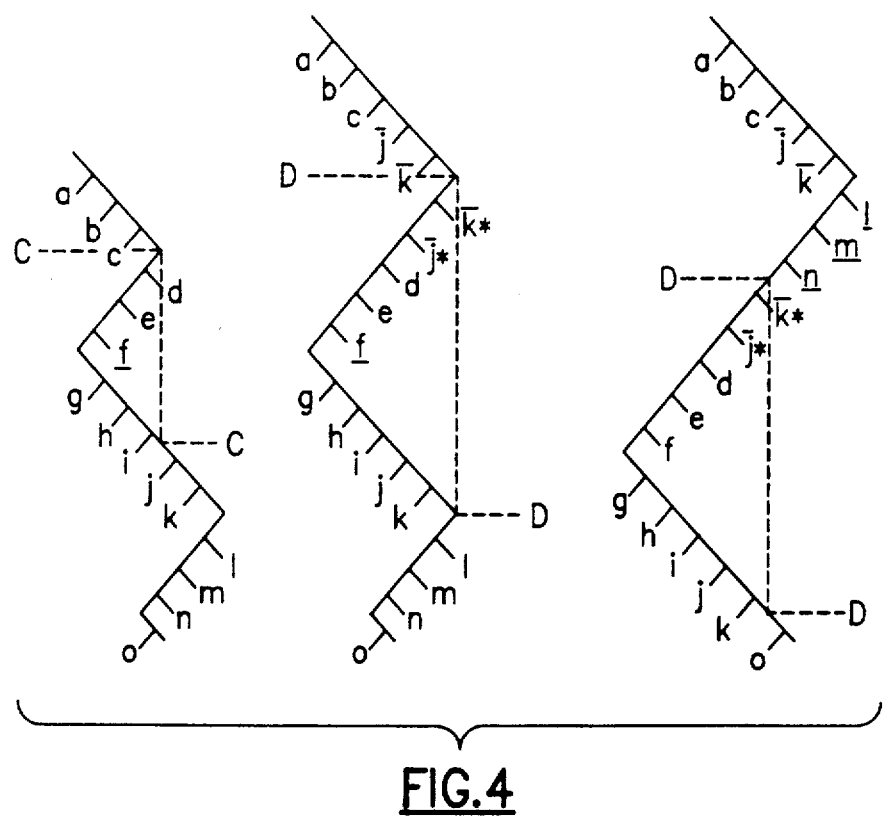
FIG. 4 is a graphical representation of eta extension in-the-large.
Figure 5:
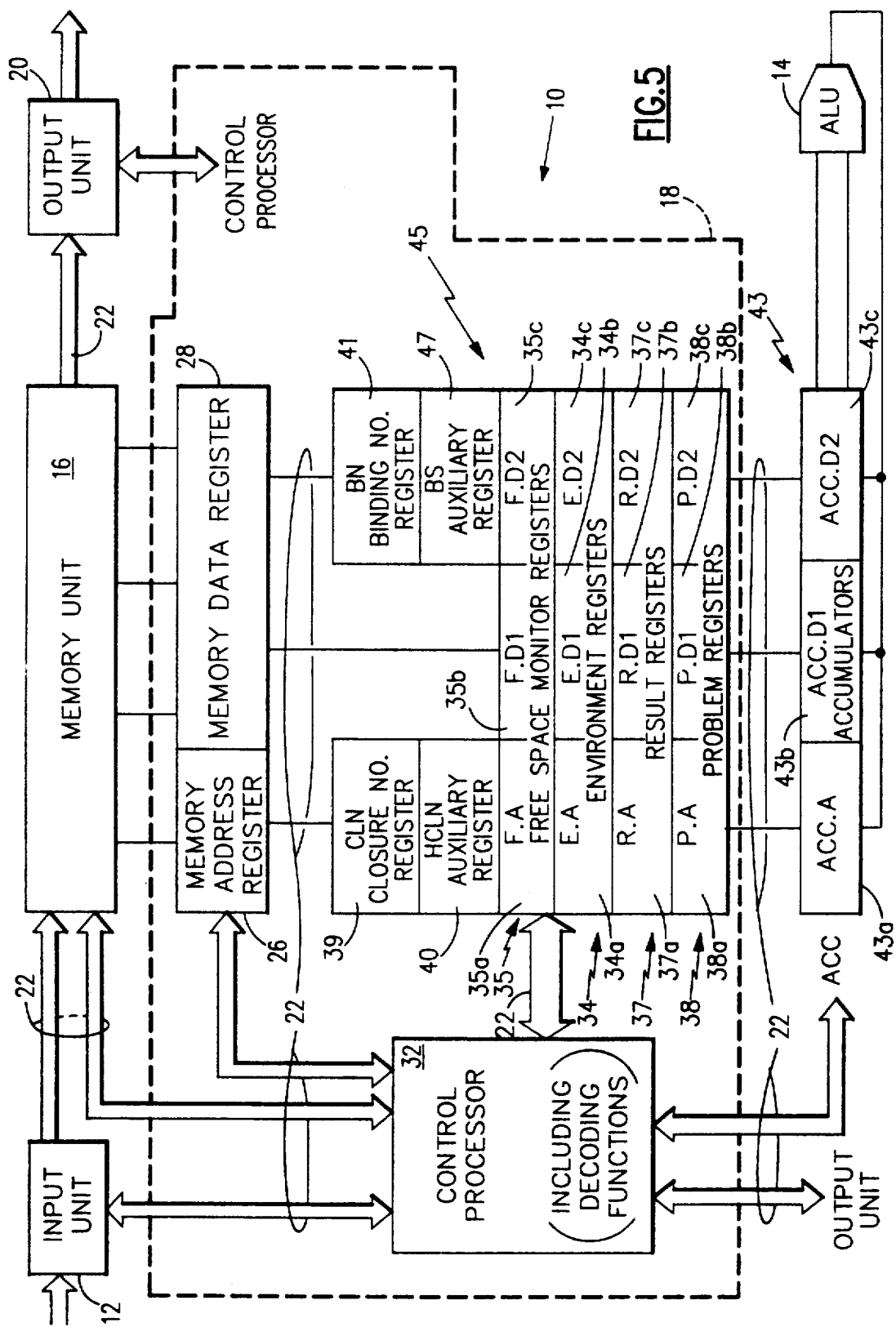
FIG. 5 is a schematic diagram of a lambda calculus computing machine according to the present invention.

Referring to FIG. 5, a lambda calculus computing machine 10, according to the present invention is shown in a schematic diagram. Computing machine 10 includes an input unit 12, an arithmetic-logic unit (ALU) 14, a memory unit 16, a control unit 18, an output unit 20, and a signal bus system 22. Signal bus system 22 provides a means for communication between input unit 12, ALU 14, memory unit 16, control unit 18, and output unit 20.

Input unit 12 comprises conventional means typically found in a general purpose computer for encoding a plurality of source elements 310 (to be described hereinbelow with reference FIG. 10) into a plurality of respective binary words. Source elements 310 are of at least three types, including a lambda type, an application type (P), and a variable type (VAR). Source elements 310 are the components of an arbitrary lambda expression in direct graph form, as illustrated in FIGS. 8 and 9. This lambda expression represents a problem to be solved by computing machine 10.

In addition to an encoding means, input unit 12 has a means for loading the binary encoded words into contiguous storage locations in memory unit 16. The loading means is implemented in any conventional manner commonly employed in a conventional general purpose computer.

Output unit 20 comprises generally conventional means for retrieving selected binary words from memory unit 16 and a conventional means for decoding said selective binary words for output to peripheral computer devices.

Control unit 18 comprises a plurality of register sets, including a free space monitor set F35, an environment set E34, a result set R37 and a problem set P38. Each of the register sets contain an address register and at least one data register. The preferred embodiment, as illustrated in FIG. 5, employs two data registers for each register set. As illustrated in FIG. 5, free space monitor set F35 contains a address register F.A, and two data registers F.D1 and F.D2. Environment register set E34 contains an address register E.A, and two data registers E.D1 and E.D2. Result register set R37 contains an address register R.A and two data registers R.D1 and R.D2. Problem register set P38 contains an address register P.A and two data registers P.D1 and P.D2.

Control unit 18, according to the present invention, further comprises a closure number register CLN39, a first auxiliary register HCLN40, a binding number register BN and a second auxiliary register BS 42. Register sets F, E, R, P, shown generally at H5, and registers CLN, HCLN, BN41, and BS are connected to signal bus system 22 as shown in FIG. 5.

Control unit 18 further comprises a memory address register 26 and a memory data register 28, providing the means for reading from and writing to memory unit 16. A desired binary word is read from memory unit 16 by setting memory address register 26, with an address of the storage location containing the binary word. This address is then transmitted to memory unit 16. The binary encoded word stored in the addressed storage location in memory unit 16 is fetched and stored in memory data register 28. A new address may be set in address register 26 by adjusting address register 26 so that it points to the next or previous storage location in memory unit 16. This is accomplished by use of an incrementer-decrementer function provided by a control processor 32, as shown in FIG. 5.

Memory address register 26 and memory data register 28 also provide the means for writing a locally stored binary word to memory unit 16. This is accomplished by setting an address in address register 26 (the address to a storage location in memory unit 16). Data register 28 receives a write control signal from control processor 32, and a binary word locally stored in data register 28 is transmitted to the addressed storage location in memory unit 16, via signal bus system 22.

Control processor 32 has the means for decoding a binary word locally stored in memory data register 28. This is accomplished by transmitting the instruction code field of the locally stored binary word from data register 28 to certain decoding logic in control processor 32. The byte pattern of this field is converted into electrical control signals for operating register sets F, E, R, and P, registers CLN39, HCLN40, BN41, and BS42, ALU 14, memory unit 16, input unit 12 and output unit 20. The control signals generated by the decoding function of control processor 32 are a function of the type of source element 310 decoded (see FIG. 10). These control signals (as dictated by the particular type of source element 310) cause the reading of a string of data elements from one area of memory unit 16, and writing to another area of memory unit 16. This is the first mode of operation (or mode one (1)) which will be described in greater detail herein below.

ALU 14 has an output register set ACC43, referred to as an accumulater register set. Accumulater register set ACC contains an address register ACC.A 43a and two data registers ACC.D1 43b and ACC.D2. 43c Accumulator register set ACC is connected to register sets F,E,R, and P, and registers CLN39, HCLN40, BN41 and BS42 by signal bus system 22. Operation of ALU 14 is conventional and well known in the computer art, and will only be discussed in connection with the operation of lambda calculus computing machine 10.

Signal bus system 22 is a general bi-directional signal bus system, permitting communication of control and data signals to and from the primary components of the preferred embodiment, as illustrated in FIG. 5.

As indicated above, the incrementing and decrementing of the contents of registers may be accomplished by appropriate circuitry located in control processor 32. However, incrementing and decrementing can occur in the ALU 14. For example, the contents of data register R.D1 37b is transmitted via signal bus system 22 to accumulater register ACC.D1 43b. A positive "1" is then added to the contents of ACC.D1 43b in ALU 14, achieving the incrementing function, and then the resulting contents is transmitted from the output of ALU 14 to ACC.D1 43b, and then back to data register R.D1 37b.

In the preferred embodiment, as illustrated in FIG. 5, typical movement of data from one register set to another is accomplished by causing contents of an address or a data register of any of the register sets to be transmitted to accumulater register set ACC 43, and in turn, transmitted by ALU 14 to a data or address register of any of the register sets F, E, R, P. For example, a transfer of contents from data register P.D2 38c to address register F.A is accomplished by transmitting the contents of P.D2 38c to accumulater data register ACC.D2 43c, which are in turn outputted by ALU 14 to accumulater address register ACC.A 43a. Contents of ACC.A 43a are then transmitted to address register F.A 35a.

According to the present embodiment, as illustrated in FIG. 5, data is moved from memory unit 16 to the address registers or data registers of register sets F, E, R, P 45 and registers CLN 39, HCLN 40, BN 41, and BS 42 via signal bus system 22. Upon addressing the desired memory location in memory unit 16, the contents of the desired memory location are transferred to memory data register 28. The contents are then transmitted from memory data register 28 to their destination, for example, address register R.A 37a. In addition, contents of address and data registers of register sets F, E, R and P 45 and registers CLN 39, HCLN 40, BN 41 and BS 42 are stored in memory unit 16 by transferring the contents to memory data register 28, and ultimately to a desired location (as selected by memory address register 26) in memory unit 16.

FIG. 8 illustrates an example of a lambda calculus expression presented in direct graph form. An encircled portion of the graph highlights the left spine of the graph, and as can be seen, it is in the form of a zigzag line.

Referring to FIG. 9, the example, as illustrated in FIG. 8, is now presented in binding indices form.

Referring to FIG. 10, the data structure for the example illustrated in FIG. 9 is set out. Each source element 310 of the data structure represents a component of the graph as shown in FIG. 9. The data structure of FIG. 10 contains complete information to reconstruct the graph as shown in FIG. 9. Source elements 310, having addresses (0) through (4), represent the left spine of the zigzag graph of FIG. 9. Source elements 310 assigned addresses (5) and (6) represent the argument pending from the top most Ap node 915 (right side of the spine), as shown in FIG. 9. Note that the first source element in the data structure is an Ap type source element and contains a pointer to address 5 (containing the first of the two source elements representing its associated argument). The complete information to reconstruct this argument is found in contiguous locations having addresses (5) and (6), as shown in FIG. 10. The zigzag line is mapped into contiguous memory locations, to take advantage of common von Neumann technology (such as instruction pre-fetch, pipelining, cache memory) which has been developed to read and execute long sequences of instructions as fast as technology permits.

The next source element in the data structure, which is assigned address (1) is a lambda type element 920. This source element has a value of three, which indicates the number of bindings (or the number of lambdas) in the sequence. The next source element in the data structure, assigned address number 2, is an Ap type element. This element 925 has a value of zero, which represents the binding index of the variable $x_i$ 830 as shown in FIG. 8 (also representing the argument associated with this Ap element).

The next source element, assigned address (3) is an Ap type element 927 and has a value of "one", representing the binding index of the variable $x_i$ 830 as shown in FIG. 8. The next source element, having address (4) is a variable type element with a value "two", which represents the binding index of the variable $x_i$ as shown in FIG. 9. This variable type source element is significant in this graph, in that it represents the head of the lambda calculus expression, and carries therefore a special code.

A data structure, like the data structure shown in FIG. 10, is fed into input unit 12 where source elements 310 are encoded into binary words. The binary words are then loaded from input unit 12 into memory unit 16 in contiguous storage locations.

In the lambda calculus computing machine according to the present invention, problem register set P 38 is generally involved in the process of fetching binary encoded source elements from memory unit 16. Result register set R 37 is primarily involved in the task of writing to and reading from a result area defined in memory unit 16. The result area is a block of contiguous storage locations situated in memory unit 16. Environment register set E is involved in the process of writing to and reading from an environment area defined in memory unit 16. The environment area is a block of contiguous storage locations situated in memory unit 16. The defined areas in memory unit 16 that contain the problem expression and the result expression are mainly read from left to right, and are therefore preferably located at the lower end of the address space of memory unit 16. The defined environment area, that contains stored data from the result expression, expands and contracts from right to left during computation. Thus, the environment area is preferably located at the upper end of the address space of memory unit 16. The free address space existing between the result area and the environment area is constantly monitored by updating register set F 35 to ensure that data corruption does not occur. Monitoring is accomplished by free space monitor register set F 35. Register set F 35 reads from the result area and from the environment area of memory unit 16, and compares the largest address from the result area with the lowest address from the environment area.

Computing machine 10 operates in at least three basic modes. In the first mode, the problem expression is read from memory unit 16, and a result expression is generated therefrom. The result expression is written into the result area of memory unit 16 as a plurality of address pointers. Computing machine 10 operates in the first mode until a lambda or a variable type source element is read from the problem expression.

Upon detection of a lambda type source element, computing machine 10 switches to a second mode. In the second mode, the result expression is read from the result area of memory unit 16 in reverse order and written into the environment area of memory unit 16. Computing machine 10 operates in the second mode until a predetermined number of binary words are written into the environment area of memory unit 16. The predetermined number of binary words is set by the number of bindings (or lambdas) in sequence associated with the lambda type source element. This number is also the value assigned to the lambda source element. This number is decremented by 1 (1) for each word written into the environment area. After the number is decremented to zero, computing machine 10 switches back to the first mode.

Upon detection of a variable type source element, computing machine 10 switches to a third mode. In the third mode, the variable type source element operates as an index into the environment area of memory unit 16, such that an address location in memory unit 16 can be computed where a pointer to an argument expression is stored. The pointer replaces the variable element. If the variable element is an argument, the retrieved pointer is simply replacing the variable.

Operation of lambda calculus computing machine 10, as illustrated in FIG. 5, is now described in detail. Initially, the problem expression, as stored in memory unit 16 in contiguous storage locations, represents a lambda expression in the form of nested zigzag lines. Each zigzag line starts out with an anchor point. The anchor point is addressed via pointer to the address location of the anchor point. The zigzag lines continue with an arbitrary sequence of Ap nodes (code=apply) and lambda nodes (code=lambda), and terminate with a head node (code=head). Lambda nodes have in their data field a count of bindings. Ap nodes comprise at least four types, including argument variables (code=-variable), argument constants (code=constant), argument symbols (code=symbols), and argument expressions (code=argument pointer). The difference between symbols and constants is minor. They denote primitive functions and primitive operands which cannot or will not be expressed as lambda expressions.

The argument pointer points to another zigzag line (actually its assigned anchor point). This nesting recursively continues until eventually all Ap nodes of a zigzag line are argument variables or argument symbols.

Head nodes comprise at least three different types, including head variables, head constants, and head symbols. Head constants and head symbols comprise the primitive data types and primitive operators respectively. Symbols include the "Y" combinator, the "IF" combinator, and many other well known primitive operators.

Referring now to FIG. 11, a flow diagram illustrates the central control function of the lambda calculus computing machine 10. In the preferred embodiment, the operation, as represented by the flow diagram in FIG. 11, is implemented in control logic in control processor 32. These control functions may be implemented by a Programmable Logic Array (PLA).

The process shown in FIG. 11 may be conceptually divided into three (3) parts. In FIGS. 11A and 11B, the case of encountering a head type code is treated. In FIGS. 11C and 11D, eta-extension and beta-reduction is handled, respectively. In FIGS. 11E and 11F the case of encountering an argument type code is treated.

In FIG. 11, WTH represents the process referred to as Walking To The Head of a lambda expression in the form of nested zigzag lines. Control commands are dispatched from WTH depending on the type of the node (or source element) encountered. Before entering WTH both problem register set P 38 and result register set R 37 are adjusted (or initialized), such that P.A 38a points to the beginning of the problem expression and R.A 37a points to the first free storage location. In register set P 38, address register P.A 38a points to the beginning of the expression. As shown in FIG. 11A, a fetch cycle is then initiated. After completion of the fetch cycle, problem data registers P.D1 38b and P.D2 contain the contents of the memory locations of memory unit 16 where address register P.A 38a is pointing to. In register set R 37, address register R.A 37a is incremented, and this action is followed by a store cycle which transfers the contents of data registers R.D2 37c and R.D1 37b in the next available locations in the result area. This is the general mode one (1) move.

Figure 11A:
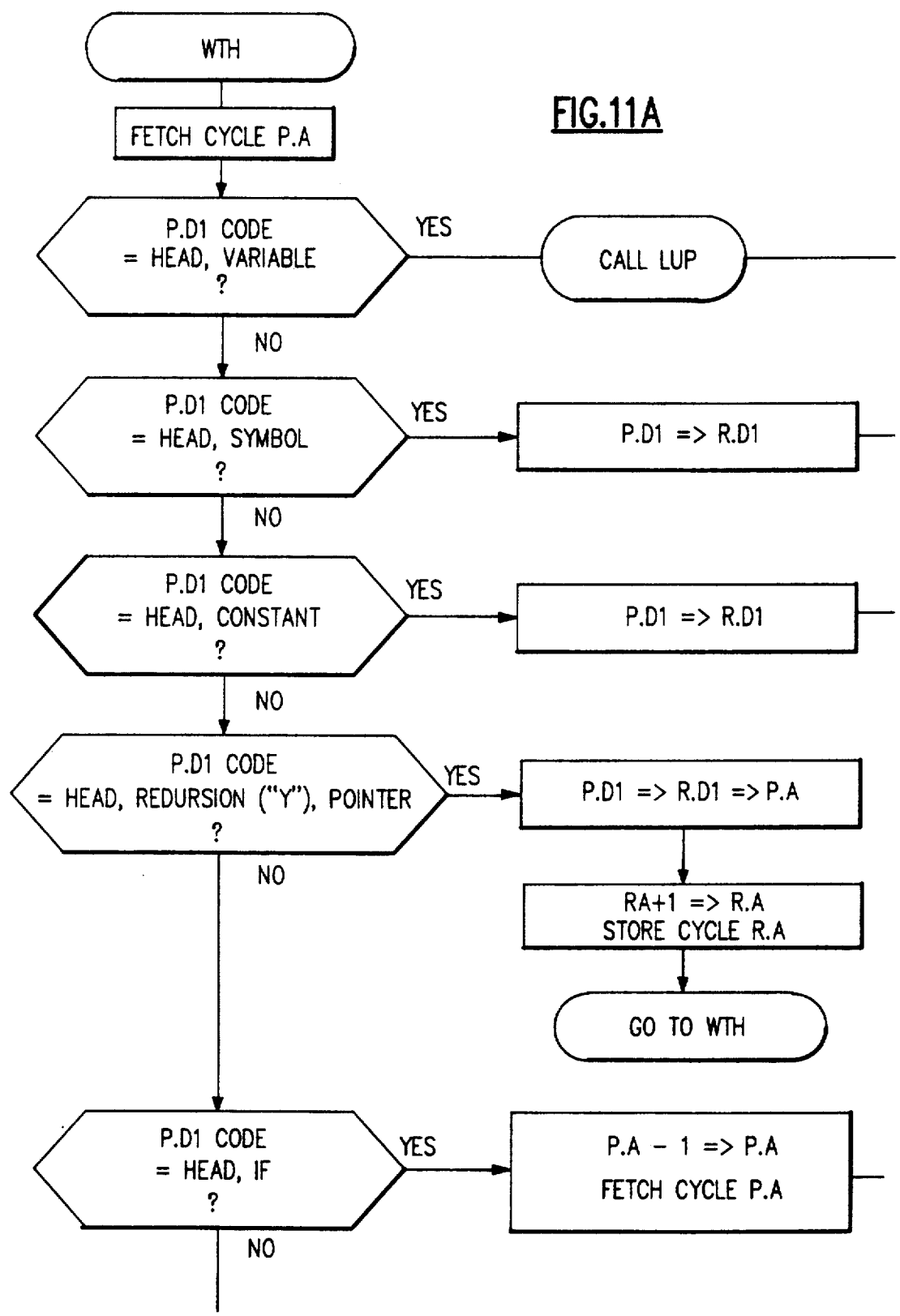
Figure 11B:
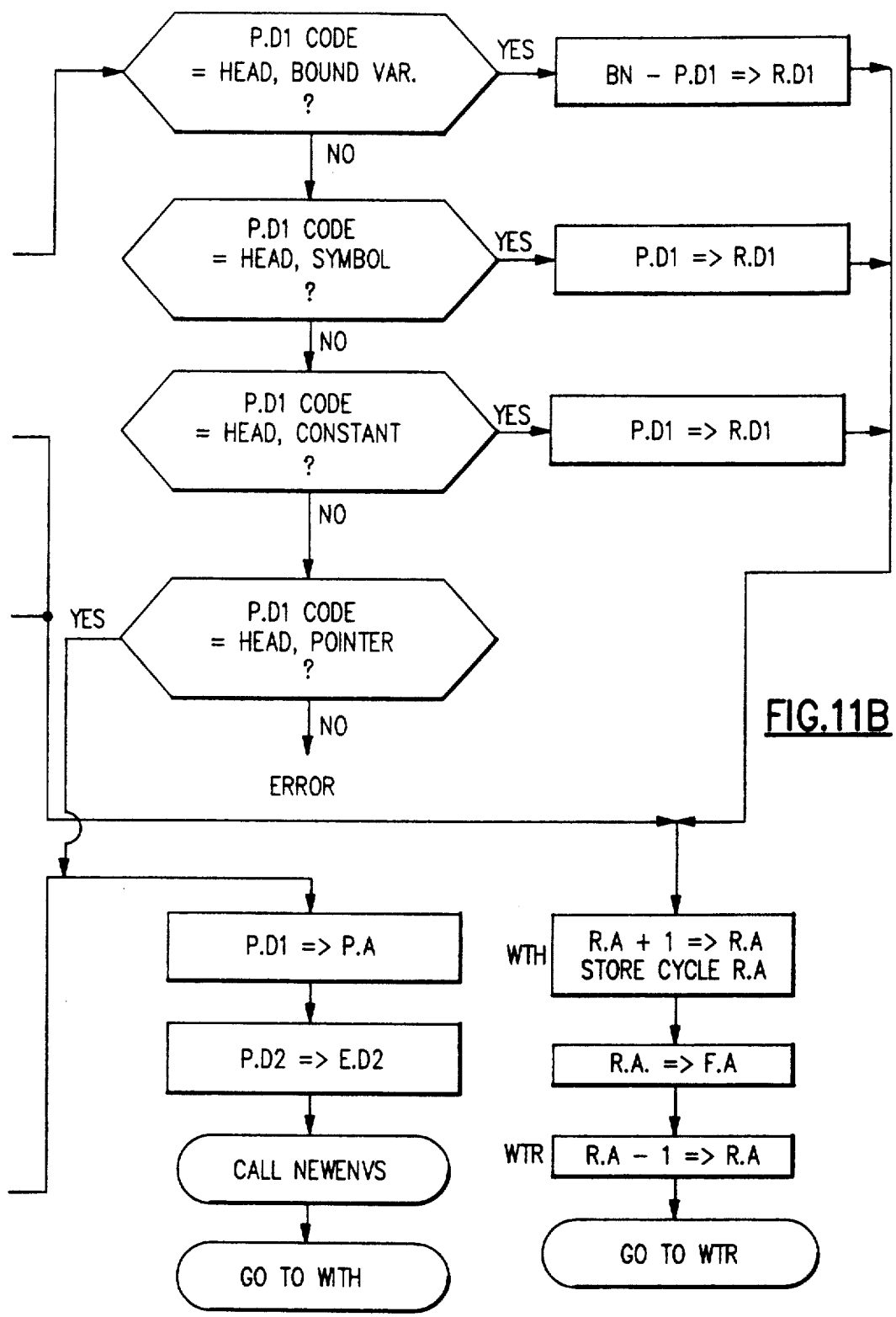

Referring to FIG. 11A, the code of the contents of data register P.D1 38b is tested to determine whether a head variable, head symbol, head constant, or particular head symbols (eg., "Y" and "IF") are present. If no head nodes are present, the contents of the data register P.D1 38b are tested for lambda nodes as shown in FIG. 11C. If a lambda node is not present, the contents of data register P.D1 38b are tested for the Ap nodes, including argument variables, argument symbols, argument constants, and argument expressions (code = argument pointer), as shown in FIG. 11E. If the data register P.D1 does not contain Ap nodes, head nodes or lambda nodes, an error is indicated, as shown in FIG. 11E.

If the contents of data register P.D1 includes a head node, specific operations will be performed on the contents depending on whether the head node is a head variable, head symbol, head constant or specific head symbol, such as an IF symbol or recursion (or "Y") pointer, as indicated in FIG. 11A.

If the argument in problem data register P.D1 is a head variable (i.e., code = head variable), a transfer of control occurs to a process referred to as LUP, as shown in FIG. 11A. This is the third mode of operation (or mode 3). LUP provides the contents of the environment and is described in detail herein below with reference to FIG. 13. If the contents of data register P.D1 38b, after LUP operation, is a bound variable, a corrected variable number (representing an index) is stored into the result area of memory unit 16, as shown in FIGS. 11B. Control is then directed to an operation referred to as Walk To The Root (WTR), as shown in FIG. 11B. WTR is described in detail herein below with reference to FIG. 15.

If the contents of data register P.D1 38b, resulting from LUP operation, contain a constant or symbol, the contents are stored unaltered in a head position of the result area, as shown in FIG. 11B. If the contents of data register P.D1 38b, after LUP operation, contain a pointer, the environment is retrieved from the anchor node pointed to, as shown in FIG. 11B. A call to an operation referred to as NEWENVS sets up the environment. NEWENVS is described in detail herein below with reference to FIG. 14. Control is then directed to WTH as shown in FIG. 11B.

As shown in FIGS. 11A and 11B, a head constant or a head symbol is also stored in the head position of the result area of memory unit 16, after which control is transferred to WTR, as shown in FIG. 11B.

A head pointer or an "IF" symbol, after specific operations, all reenter mode one (1) by transferring control to WTH; however, a new environment section is formed by calling NEWENVS, as shown in FIGS. 11A and 11B.

Figure 11D:
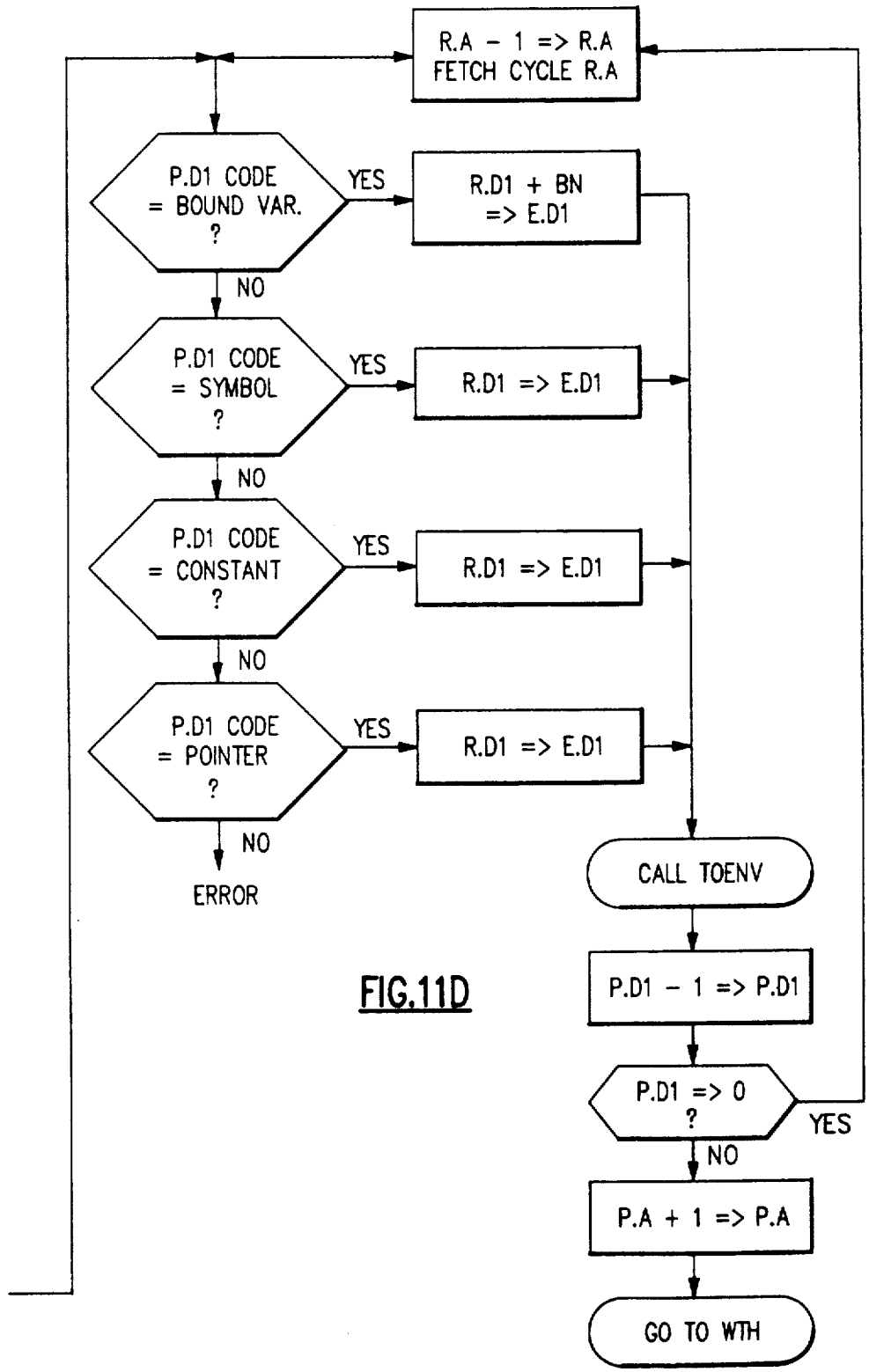
Figure 11E:
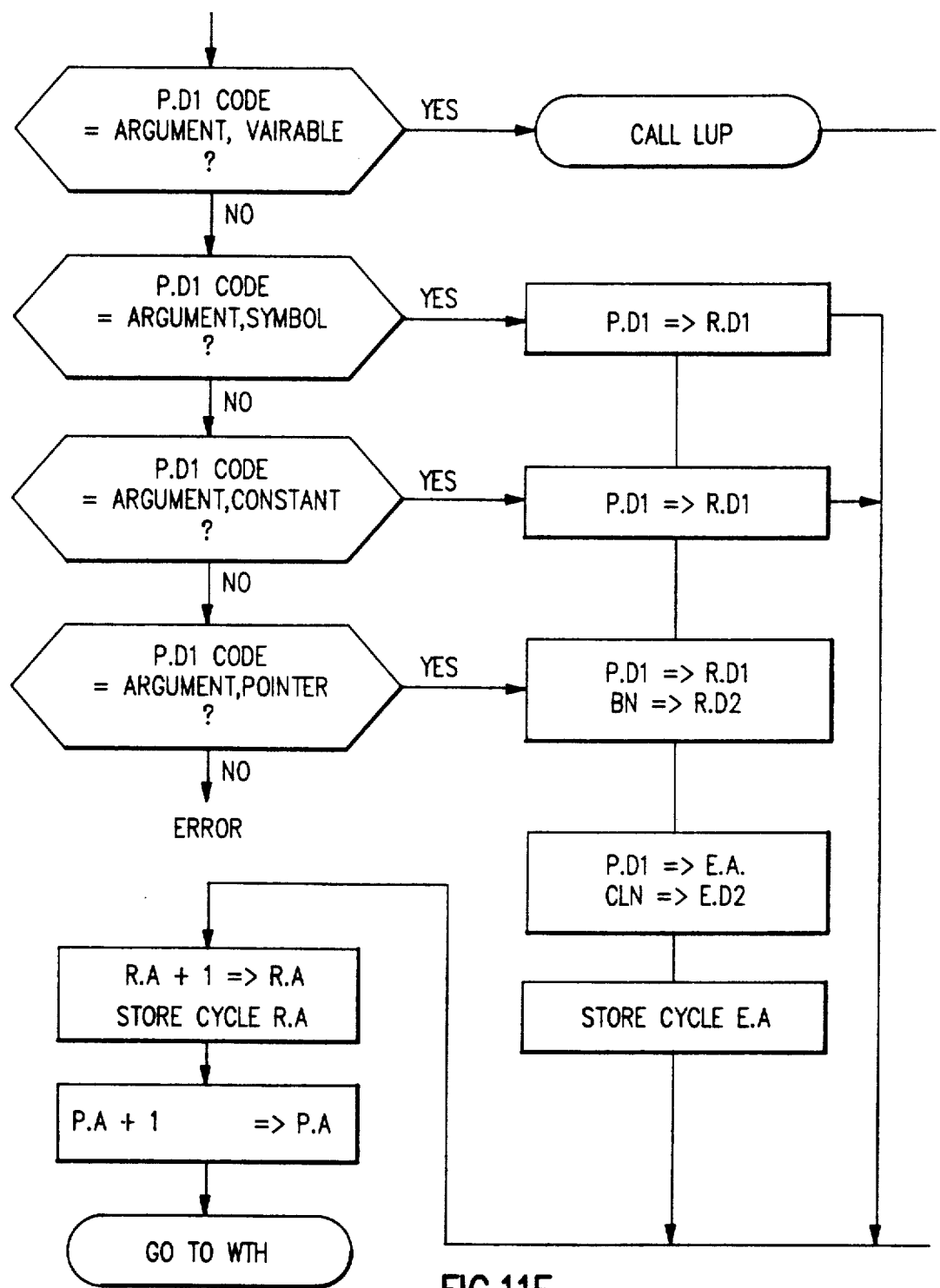

The encountering of lambda nodes leads to the operations shown in FIGS. 11C and 11D. This is the second mode of operation (or mode 2). FIG. 11D is devoted to the beta-reduction process. A lambda node (P.D1 code = lambda) may appear in the context of an anchor node (R.D1 code = anchor), a lambda node (R.D1 code = lambda), or an ap node (R.D1 code = ap). This last case reflects the existence of a beta-redex and triggers the beta-reduction preformed by the loop in FIG. 11D. As many times as the ap-lambda condition repeats (see test, P.D1>0 in FIG. 11D), the corresponding argument is moved to the environment by employing an operation referred to as TOENV, as shown in FIG. 11D. TOENV is described in detail herein below with reference to FIG. 12. An exceptional handling occurs only if the argument is a variable. Here, the variable index is combined with the current BN number for later correction, as shown in FIG. 11D.

The beta reduction process as shown in FIG. 11D is repeated until the number of lambdas detected in data register P.D1 is exhausted. As shown in FIG. 11D the loop directs control to the beginning of the beta reduction process as long as the value of the lambda source element is greater than zero. Upon exhaustion of this number, entry to WTH is prepared by incrementing problem address register P.A 38b., and WTH is entered again. The two (2) remaining cases in FIG. 11C (P.D1 Code = lambda & R.D1 Code = Anchor and P.D1 Code = lambda & R.D1 Code = lambda) are dealing with eta-extension. The loop shown transfers every lambda encountered in these conditions to the result area (in one piece at the end of the loop) and inserts into the environment the current BN number, which is used after calling LUP to correct variable indices as shown in FIG. 11B and FIG. 11F.

Before the eta-extension process takes place, register R.D1 37b is initially set to zero, as shown in FIG. 11C. Register BN 41, is then incremented to yield a number one in its contents. This number is referred to as an "extension argument." The extension argument is then transferred to the environment data register E.D1. The contents in result data register R.D1 are also incremented, representing the creation of additional lambdas. A value number, representing the number of lambdas in the problem data register P.D1 38b, is decremented, and tested to see if it is greater than zero. If it is greater than zero, the eta extension process is repeated. When eta-extension is complete, results are stored in the result area of memory unit 16, as shown in FIG. 11 C. Problem address register P.A is incremented and control is transferred back to WTH so that the next source element is read from the problem expression in memory unit 16.

Figure 11F:
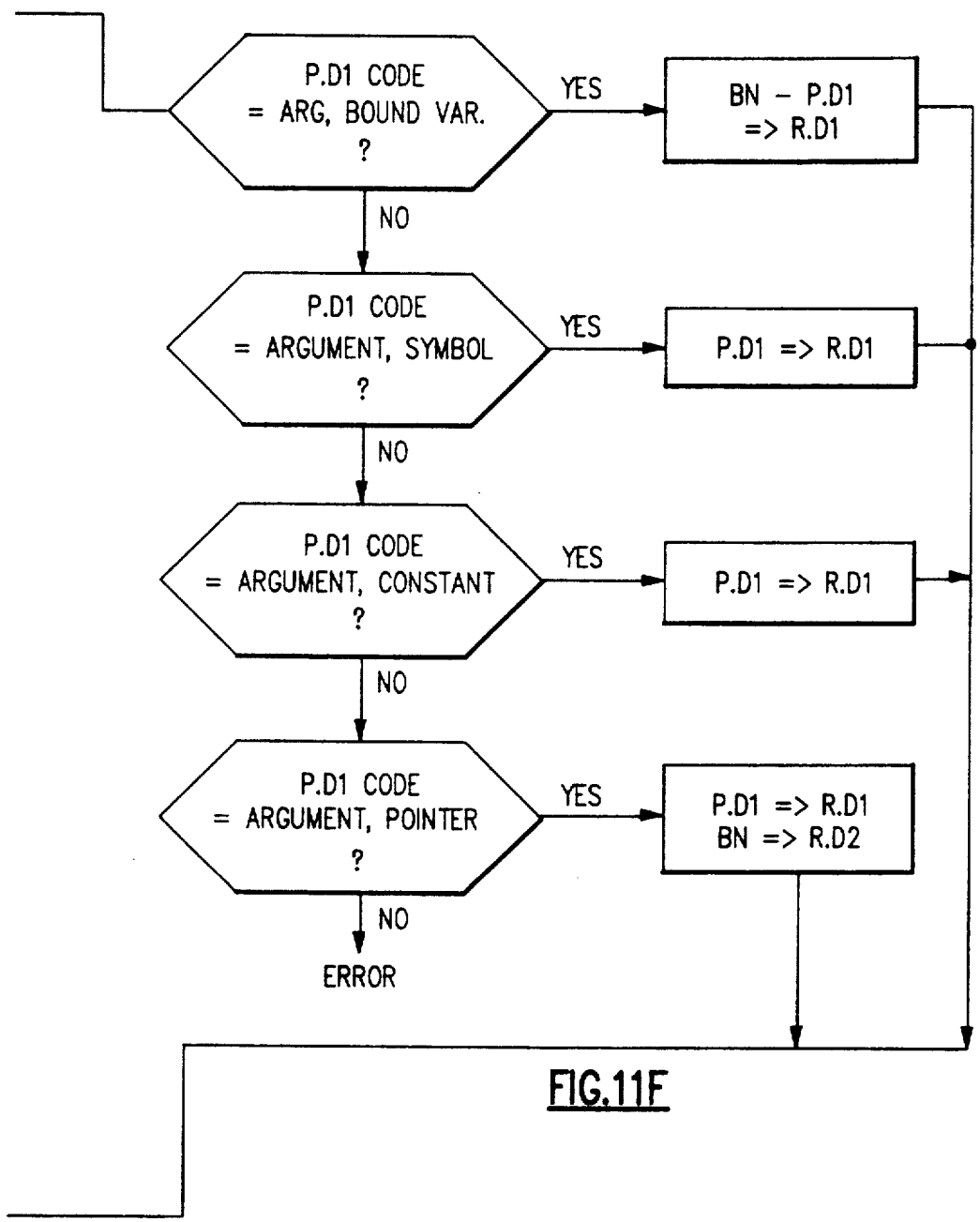
Figure 13:
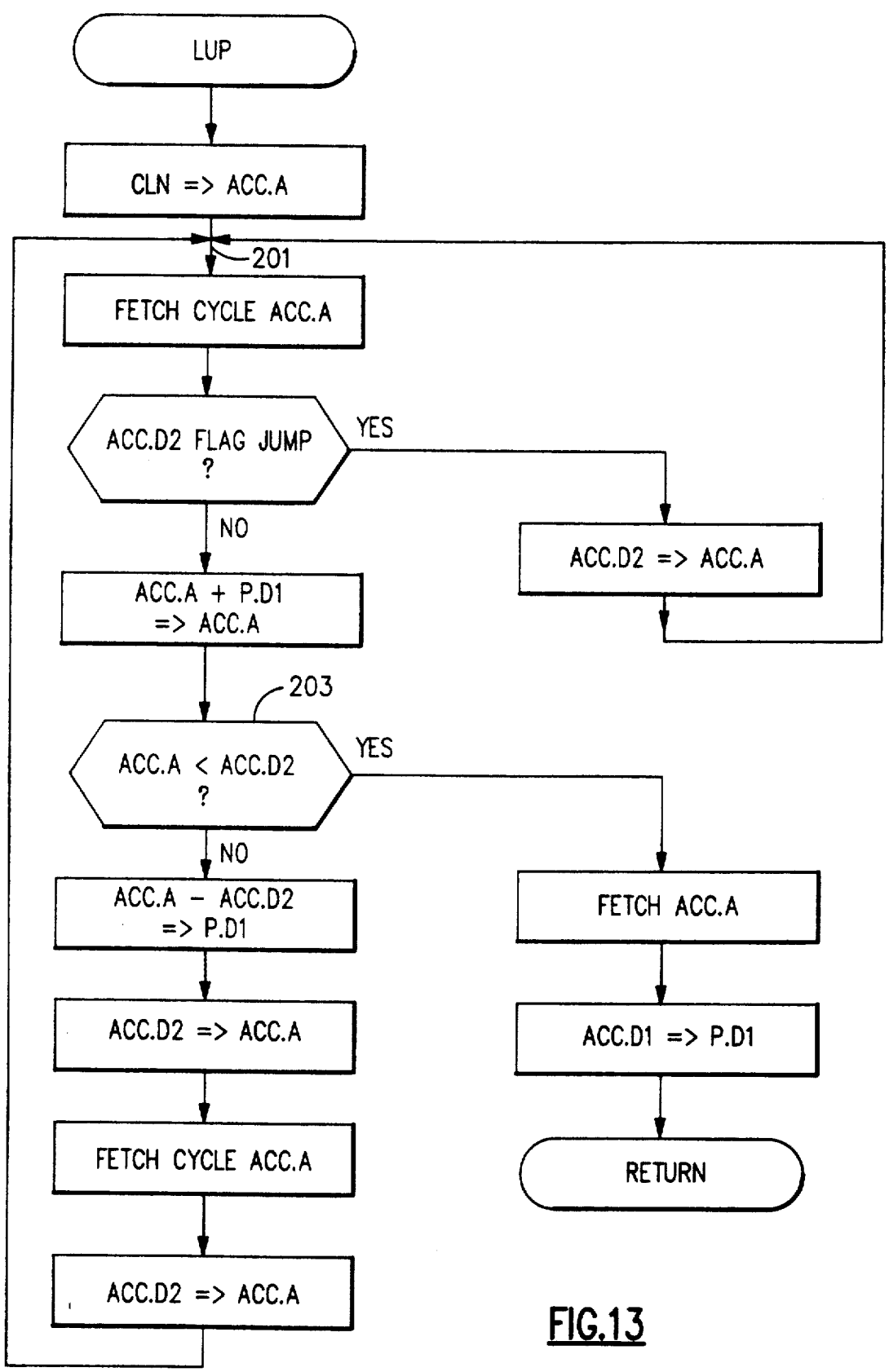
FIG. 13 is a flow diagram of a control function of the computing machine illustrated in FIG. 5, referred to as LUP.

The case of encountering an argument type code (code = argument) is treated in FIGS. 11E and 11F. If a variable is encountered in the argument position, it is looked up in the environment by a transfer of control to LUP. The flow diagram describing LUP is shown in FIG. 13. If the result of LUP is a bound variable, a corrected index goes into the result area, as shown in FIG. 11F. If the result of LUP is a symbol or a constant, the contents of data register P.D1 38b are transferred unaltered to result data register R.D1 37b, and stored in the result area, as shown in FIGS. 11F and 11E. If the result of LUP is a pointer to an expression, the contents of data register P.D1 are transferred to result data register R.D1 37b and then stored in the result area, as shown in FIGS. 11F and 11E. The current value stored in register BN 41 is transferred to result data register R.D2 37c, and then stored in the result area. The pointer points to an anchor node in the environment area. The anchor node has linked to it, in the environment area, the argument which constitutes a lambda expression to be reduced. The argument and the pointer are collectively referred to as a "closure." The closure contains all the information necessary to reduce the argument if encountered when executing WTR.

If the argument is a node containing a symbol or constant (2nd and 3rd cases in FIG. 11E), the contents of data register P.D1 (in each case) are transferred unaltered to result data register R.D1 37b and then stored in the result area, as shown in FIG. 11E. Problem address register P.A 38a is incremented and control is transferred back to WTH so that the next source element is read from the problem expression.

If the argument is a node containing a pointer (last case in FIG. 11E), a closure is created by loading the contents of problem data register P.D1 38b into result data register R.D1; loading the current number from register BN 41 (i.e., the BN number) into result data register R.D2 37c; loading the contents of problem data register P.D1 38b into environment address register E.A; loading the current number from register CLN 39 (i.e., the CLN number) into environment data register E.D2; storing the contents of E.D2 43c into the environment area of memory unit 16 at the address location specified in E.A 34a; and storing the BN number (present contents data register R.D2 37c) into the result area, as shown in FIG. 11E.

In creating a closure, the CLN number becomes the entry point into the environment area and is linked to the anchor node pointed to by the pointer transferred from data register P.D1 to address register E.A 34a. Upon creation of the closure, the address in address register P.A 38a is incremented and a new source element is fetched from the problem area immediately after reentering the WTH loop. This concludes the description of FIG. 11.

TOENV operation is illustrated in FIG. 12. Upon entering TOENV, environment address register E.A 34a is decremented by the number one (1) to address the next location in the environment area (since loading of the environment area starts from the highest memory location and works downward to the lowest location assigned to the environment area). The contents of register BS are transferred to data register E.D2 34c, and a store cycle is executed so that the contents of E.D2 are stored in the environment area at the address specified by E.A 34a. Control is then returned to routine WTH in progress.

LUP operation is illustrated in FIG. 13. Upon entering LUP, the current CLN number is transferred to the accumulator address register ACC.A 43a. A fetch cycle is performed to obtain the contents of the memory location specified by ACC.A, and to load it into accumulator data register ACC.D1 43b and ACC.D2 43c. After the fetch cycle, the contents of data register ACC.D2 are tested for a pointer, called "Flag Jump" in FIG. 13. If the pointer is present, the contents of data register ACC.D2 are transferred to the address register ACC.A and control is looped back to point 201 for a repeated operation within LUP. After another fetch cycle, specified by the Flag Jump pointer, the contents of data register ACC.D2 are again tested.

If the contents of data register ACC.D2 43c does not contain a pointer, address register ACC.A 43c, is incremented by the value number contained in data register P.D1 38b. The summed value contained in register ACC.A is checked to determine if it is less than the value number contained in register ACC.D2. If it is not, the value register of ACC.A is decremented by the value number contained in data register ACC.D2, and the result is transferred to data register P.D1. The value number of data register ACC.D2 is transferred to address register ACC.A. A fetch cycle is executed for the address stored in ACC.A; the contents retrieved is immediately loaded into register ACC.D2 and then transferred to address register ACC.A. Control is looped back to point 201 and LUP operation is repeated.

If the test at box 203 of FIG. 13 yields an affirmative result, a fetch cycle is executed for the address stored in register ACC.A 43a. The contents retrieved are immediately loaded in data register ACC.D1 43a and then transferred to data register P.D1 38b. Control is then returned to routine WTH in progress.

Figure 14:
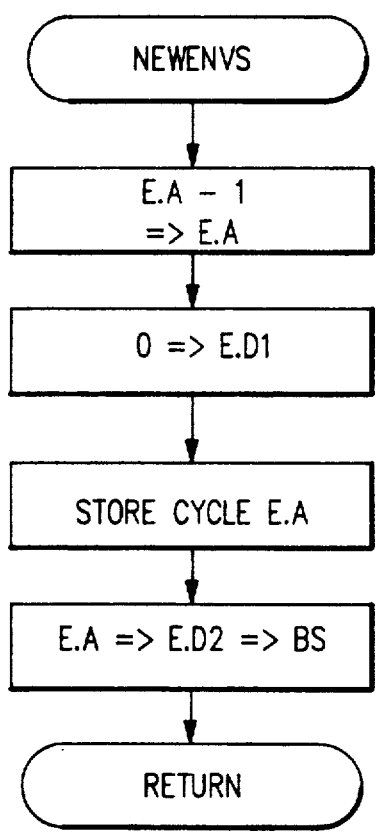
FIG. 14 is a flow diagram of a control function of the computing machine illustrated in FIG. 5, referred to as NEWENVS.

NEWENVS operates to create a jump point in the environment area and its operation is illustrated in FIG. 14. Upon entering NEWENVS, the contents of the value number contained in address register E.A 34a is decremented by one (1); data register E.D1 34b is cleared; and a store cycle is executed so that the cleared contents of register E.D1 are stored in the environment area at the address specified by E.A. The contents of register E.A is then transferred to registers E.D2 34c and BS 42, and control is returned to routine WTH in progress.

Figure 15A:
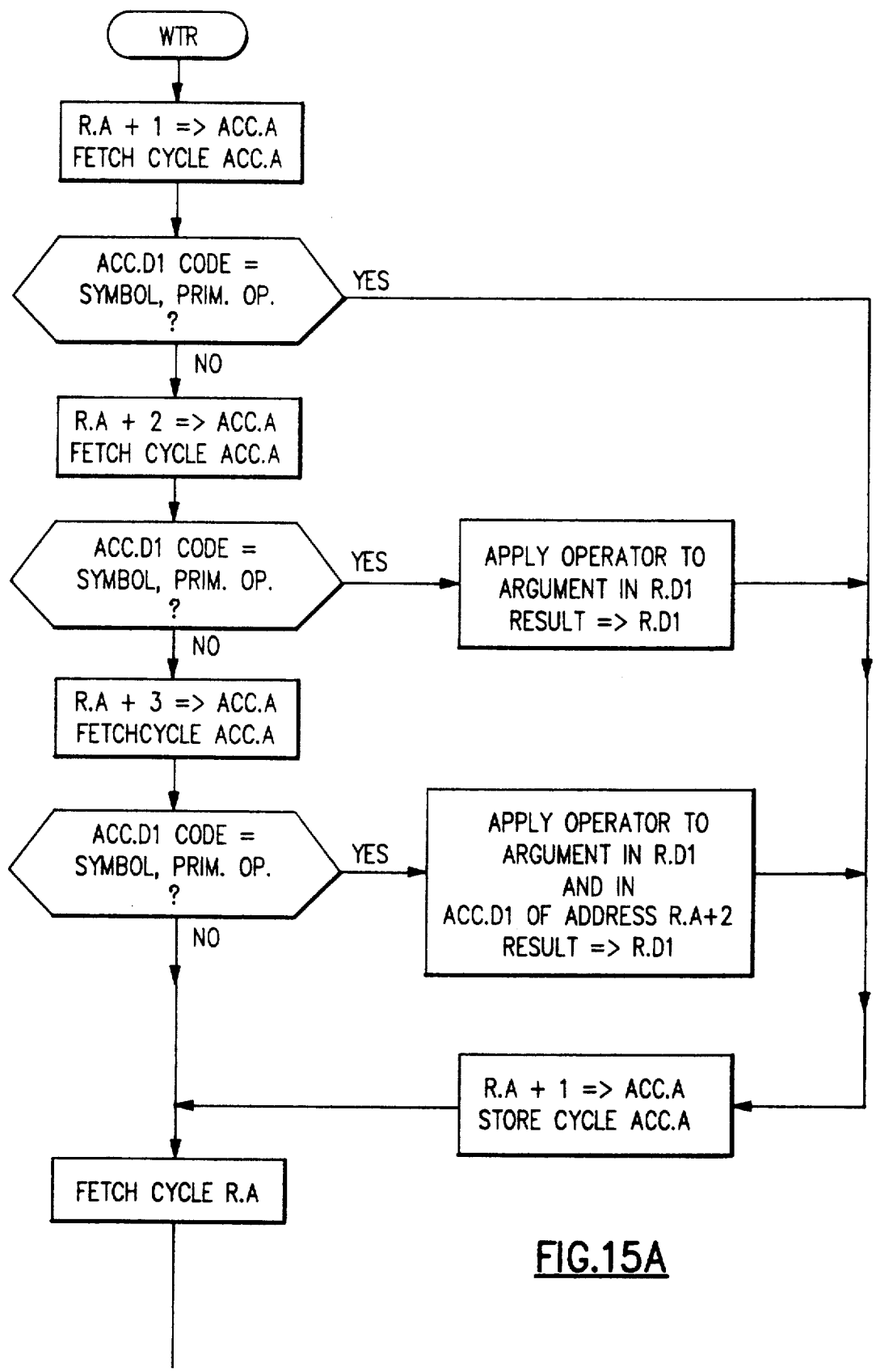
FIGS. 15A, 15B, and 15C are flow diagrams of a control function of the computing machine illustrated in FIG. 5, referred to as WTR.
Figure 15B:
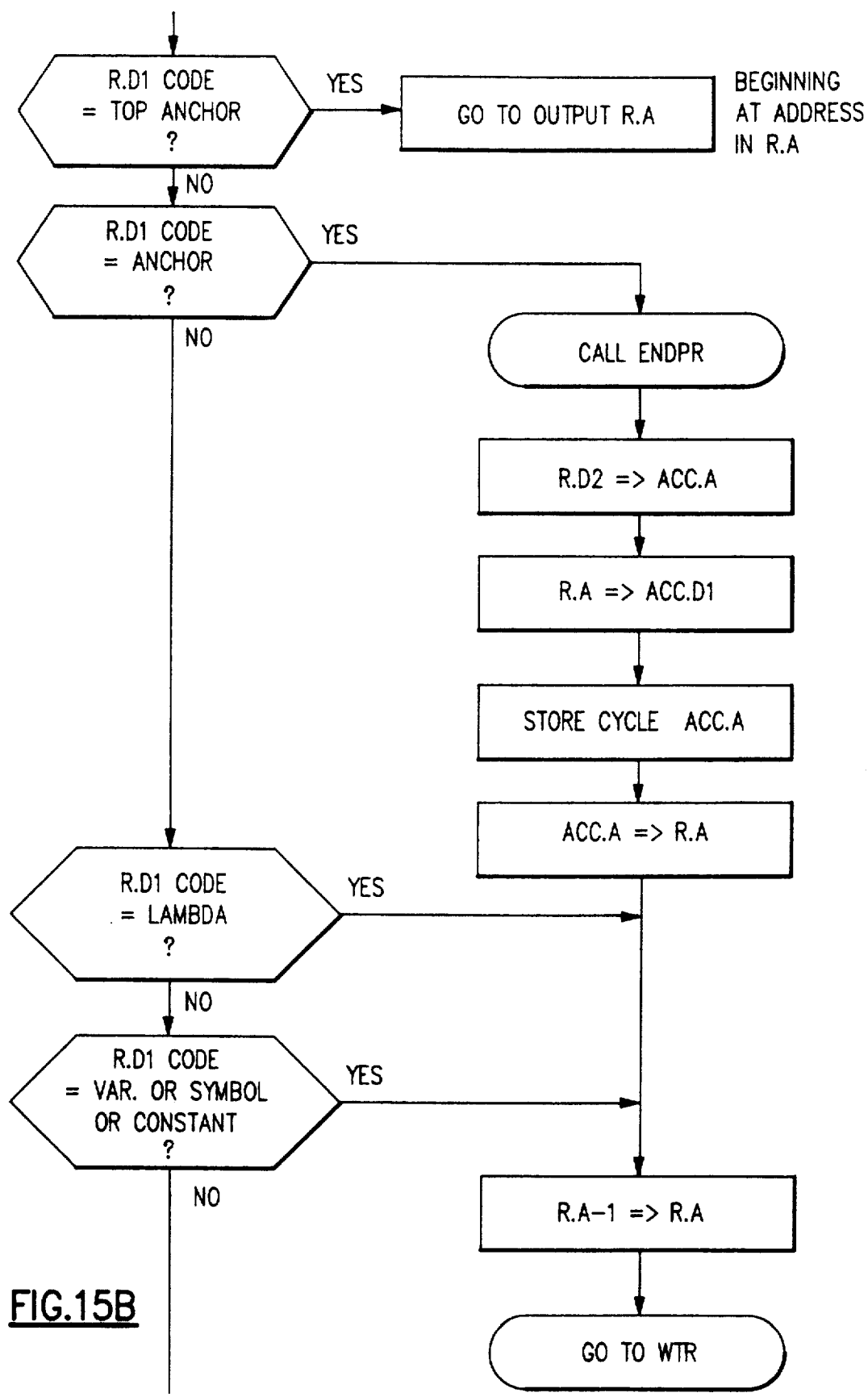
Figures 15, 15C:
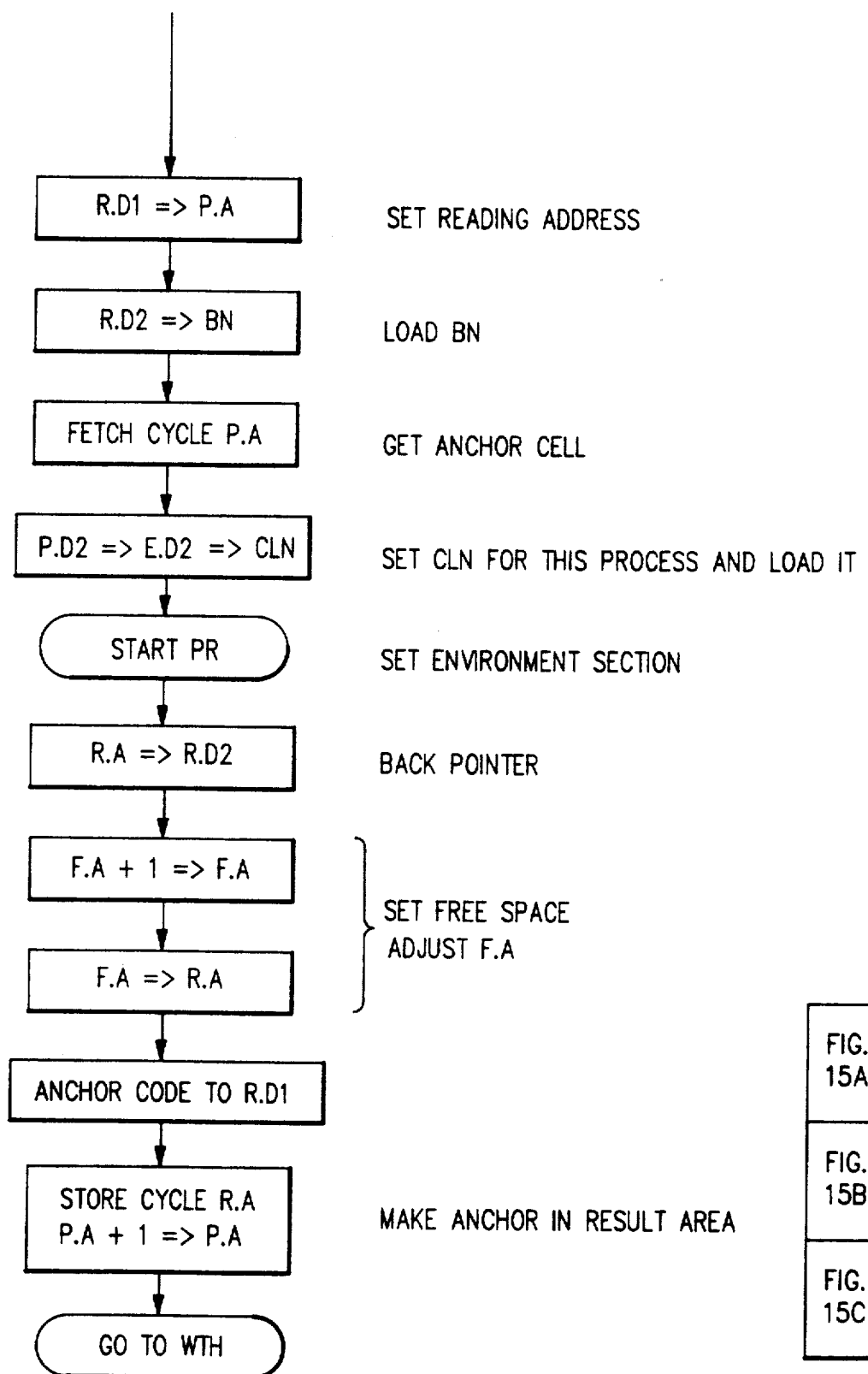

Referring to FIG. 15, the operation of WTR is illustrated in detail. WTR causes lambda calculus computing machine 10 to scan the result expression (as it appears in the result area) in a reverse direction towards the root of the result expression. Before the details of operation of WTR can be understood, the establishment of the result expression and the reverse operation of machine 10 must be explained.

The result expression is established by creating an anchor point having a code that signals the end of the reduction process and including a pointer that triggers control of output unit 20. Thus, if address register R.A 37a. is set to address the anchor point location in the result area, output unit 20 begins to write out the result expression. The result expression is generated in a forward direction (i.e., from the lowest assigned memory location to the highest) following the anchor point in the result area of memory unit 16. In the reverse mode, result register set R is operated such that data register R.A. is decremented and a fetch cycle is executed (see FIG. 15B). This causes the preceding result expression element to be fetched. In the reverse mode, the closures formed in FIG. 11 are set up for execution by loading registers BN 41 and CLN 39, as shown in FIG. 15C. The closures will be executed by transferring control to WTH. Upon returning from executing a closure, the resulting expression is connected via pointers to the next higher result (head normal form) which is shown in FIG. 15B, by the sequence starting with CALL ENDPR.

Now referring to FIG. 15A, primitive operators are continuously checked in the context of the operands computed by WTR. Contents from locations in the result area are fetched and loaded into accumulator data register ACC.D1 43b. The contents are tested to determine if a symbol or primitive operator is present. If a primitive operator or symbol is present, the corresponding result obtained by ALU 14 is inserted into the result area, as shown in FIG. 15A.

If a primitive operator or symbol is not present, a fetch cycle is executed, causing the contents from the result area located at the address specified by register R.A 37a to be retrieved. The contents is loaded into data register R.D1 37a and tested to determine if a Top Anchor code is present, as shown in FIG. 15B. If such a code is present, the result expression is written out by output unit 20. If such a code is not present, the contents are tested for an intermediate anchor code. If such an intermediate anchor code is present, a call to an operation referred to as ENDPR is made. ENDPR is described in detail herein below with reference to FIG. 17.

After ENDPR operation, a pointer to the intermediate anchor node is inserted at the next higher head normal form, as shown in FIG. 15B. That is, the contents of register R.D2 are transferred to register ACC.A 43a; contents of register R.A are transferred to register ACC.D1 43b; a store cycle is executed which results in the contents of register ACC.D1 being stored in the result area. Following this operation, reverse scanning of the result expression continues to the next lowest location in the result area (i.e., register R.A 47a is decremented by the number one (1) and control loops back to the beginning of WTR), as shown in FIG. 15B.

If an intermediate code is not present, the contents of register R.D1 37b are tested for a lambda, constant, symbol, or variable code. If any of these code types are present, the reverse scanning of the result expression continues to the next lowest location in the result area, as shown in FIG. 15B. No operation is performed on these code types since they comprise a reduced expression.

If a lambda, variable, symbol or constant code is not detected, the code should be a pointer by default. Control passes, in the WTR flow diagram, from FIG. 15B to FIG. 15C. Referring to FIG. 15C, a process to reduce the expression pointed to is initiated. The pointer is actually pointing to the anchor point assigned to that expression, and the environment is linked to that anchor point.

As shown in FIG. 15C, the contents of register R.D1 are transferred to problem address P.A. Register BN is loaded with the contents of result register R.D2. The anchor node is retrieved by execution of a fetch cycle as specified by address register P.A 38b. The contents of problem data register P.D2 38c are loaded into environment data register E.D2 34c and register CLN 39. Control is then switched to an operation referred to as STARTPR. STARTPR is described in detail herein below with reference to FIG. 16.

After STARTPR operation, the contents of address register R.A are loaded into data register R.D2 37c. The new result area for the process to be started begins at the next location from the last entry of the prior result expression. The free monitor register set F 35 is employed to monitor the last memory location in use in the result area. Monitoring is accomplished by incrementing address register F.A 35a by the number one (1) and loading its contents into result address register R.A. Free monitor address register F.A is therefore pointing to the last used location in the result area. An anchor node is stored in the F.A+1 location in the result area by loading it into data register R.D1 37b and executing a store cycle to a result area location as specified by register R.A 37a. A back pointer is stored in data register R.D2 37c.

Lastly, problem address register P.A 38a is incremented from its address originally obtained from data register R.D1 37a (i.e., beyond the anchor point) and control is transferred to WTH, where the next problem expression element from memory unit 16 is retrieved and processed.

Figure 16:
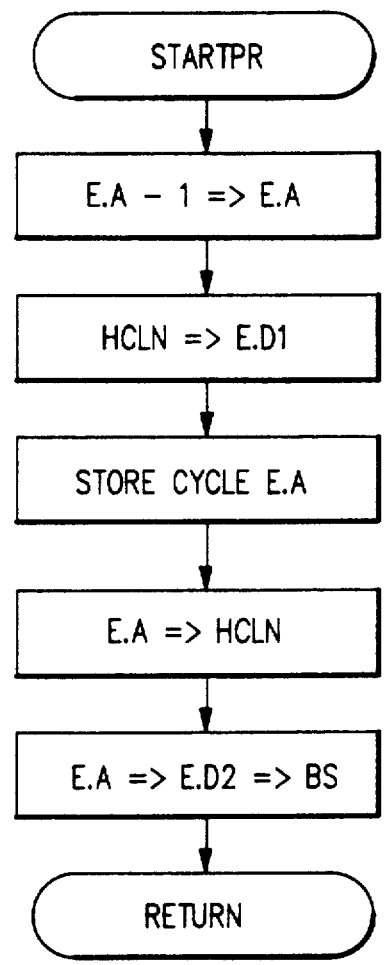
FIG. 16 is a flow diagram of a control function of the computing machine illustrated in FIG. 5, referred to as STARTPR

STARTPR operation is illustrated in FIG. 16. STARTPR initiates a new section of the environment area. It also creates a plurality of jump points in a chain of pointers. The jump points are pointed to by register HCLN 40. Thus, whole collections of data in the environment area do not have to be saved for the reduction process. Upon entering STARTPR, the address located in address register E.A 34a is decremented by the number one (1); the contents of register HCLN 40 are transferred to environment data register E.D1 34b; and a store cycle is executed transferring the contents of register E.D1 34b to the environment area location specified by register E.A 34a. Following this routine, the contents of environment address register E.A are transferred to register HCLN, environment data register E.D2 34c, and register BS 42. Control is then returned to routine WTR in progress.

ENDPR operation is illustrated in FIG. 17. ENDPR is a housekeeping routine, designed to dispose of portions of the environment not further needed. ENDPR is the reverse process of STARTPR. ENDPR reverts the environment to the state it was in before calling STARTPR. Upon entering ENDPR, the contents of register HCLN 40 are transferred to accumulator address register ACC.A 43a and a fetch cycle is executed to retrieve the contents of memory location specified by address register ACC.A. The contents of register HCLN are incremented by the number one (1) and the result is transferred to environment address register E.A 34a. A fetch cycle is then executed to retrieve the contents of the memory location specified by address register E.A. Following these steps, the contents of accumulator data register ACC.D1 are transferred to register HCLN 40. The contents of data register E.D2 are tested to determine if a flag is present, and whether the flag indicates a jump. If so, the contents of environment address register are transferred to register BS and control is returned to routine WTR in progress. If the flag does not indicate a jump, the contents of data register E.D2 34a are transferred to register BS 42, and control is returned to routine WTR in progress.

Referring to FIG. 6, a second embodiment of a lambda calculus computing machine, according to the present invention, is shown. FIG. 6 presents a schematic diagram of a lambda calculus computing machine 110, according to the present invention. In this embodiment, similar parts have been numbered with reference numerals 100 higher than similar parts in the embodiment of FIG. 5. The second embodiment, as illustrated in FIG. 6, further comprises a pipeline memory unit 136 which is connected to register sets F,E,R and P 145. Pipe-line memory unit 136 is employed, according to the present invention, as a buffer for storing the result expression. The employment of pipeline memory 136 reduces the processing time in the second mode of operation. Operation time is reduced since result data register R.A1 37a fetches elements from the result expression stored in pipeline memory unit 136, rather than memory unit 116. Pipeline memory unit 136 may be fabricated on the same computer chip containing the register sets for economy and speed.

In order to implement the second embodiment of lambda calculus comprising machine 110, the address code transferred to address register R.A1 37a must contain an additional code to direct store and fetch operations to and from pipeline memory unit 136 respectively. Alternatively, if pipeline memory unit 136 is used as a dedicated result area, solely accessible by the result register set R 137, no change in address code would be necessary. In addition, pipeline memory unit 136, functioning as a dedicated result area, would not require free address space monitoring by register set F 135. However, free address set register F may be employed in monitoring the problem area of memory unit 116 and the environment area of memory unit 116.

Figure 7A:
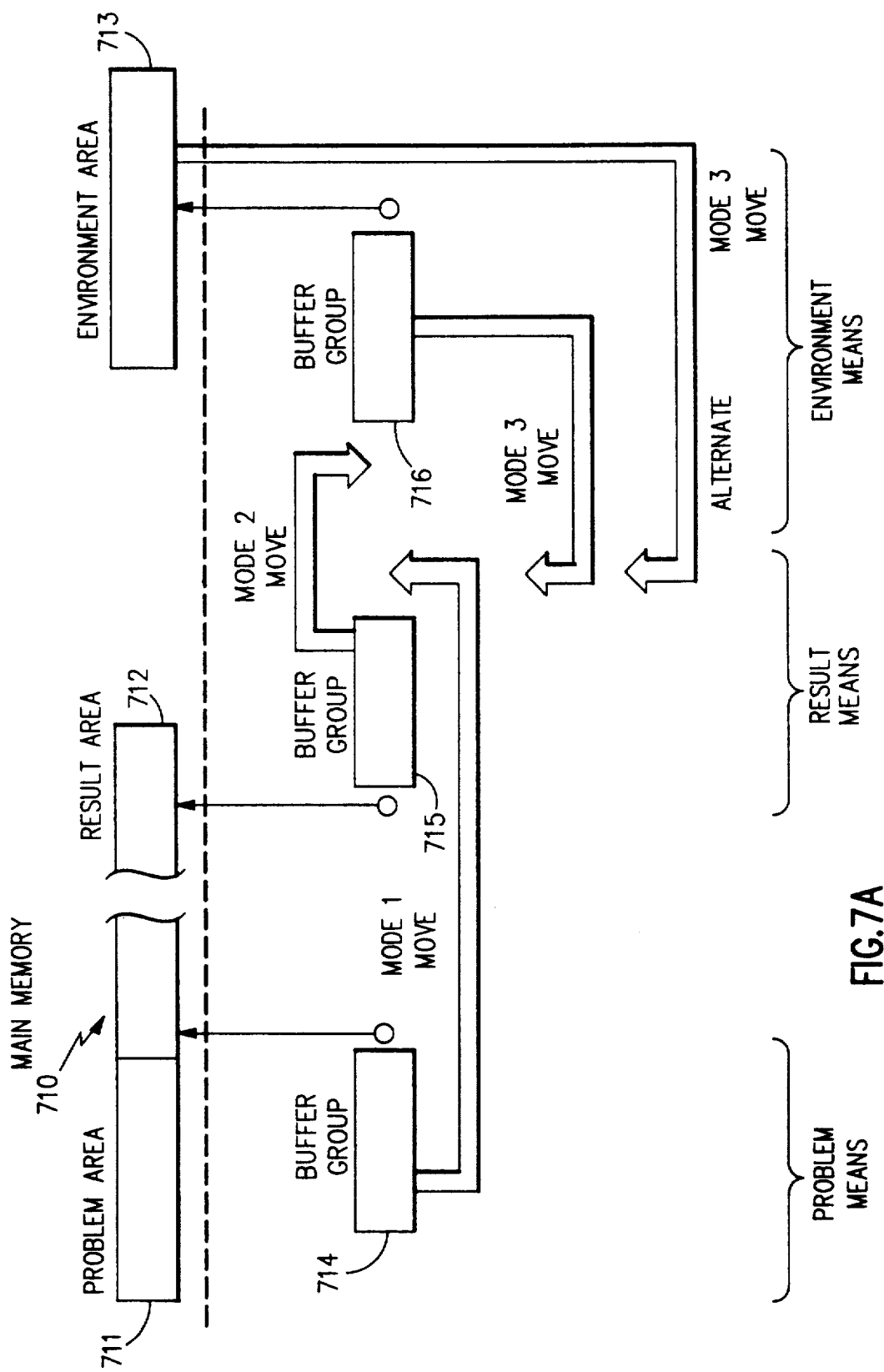
FIG. 7a is a representation of memory and data flow of the second embodiment of the lambda calculus computing machine.

Pipeline memory unit 136 comprises a plurality of buffer registers subdivided into buffer groups. One group is dedicated for use with problem register set P, another with result register set R 137, and another with environment register set E 134. Referring to FIG. 7A, the operation of computing machine 110 using buffer registers in cooperation with problem register set P 138 is similar to conventional prefetch and/or pipeline operation, in that a mode one (1) move can be executed immediately from the corresponding buffer group. Source elements fetched from main memory to a given buffer group can be prepared for processing in advance before being called.

Operation of computing machine 110 using a buffer group in cooperation with result register set R 137 is such that a mode one (1) move does not involve any immediate accesses to main memory unit 116. Some main memory store cycles are necessary; however, they can be scheduled by control processor 132 at a time when the buffer group for register set R 137 is full.

Operation of computer machine 110, using a buffer group in cooperation with environment register set E, enables some mode three (3) moves to index into the buffer group, thus avoiding accesses to memory unit 116, for relatively local variables. Also, a mode three (3) move targets into the result area set up in the buffer group associated result register set R 137, and thus does not involve accesses to memory unit 116.

The second embodiment expedites and accelerates processing by use of the buffering capability of pipeline memory unit 136, for the various modes of operation of computing machine 110. While some processing does not involve main memory unit 116 at all, a certain number of main memory cycles actually have to be executed. But, because of the buffering capability employed in the second embodiment, control processor 132 can schedule these cycles optimally.

Control processor 132 makes use of pipeline memory unit 136 in a way consistent with the above description and allots the memory cells in unit 136 to the problem register set P, result register set R, and environment register set E accordingly.

A third embodiment of the present invention provides an alternative arrangement to the second embodiment. In the third embodiment, transfer of data between the result area and the environment area can be accomplished by storing pointers in the environment area that point to storage locations in pipeline memory unit 136.

Figure 7B:
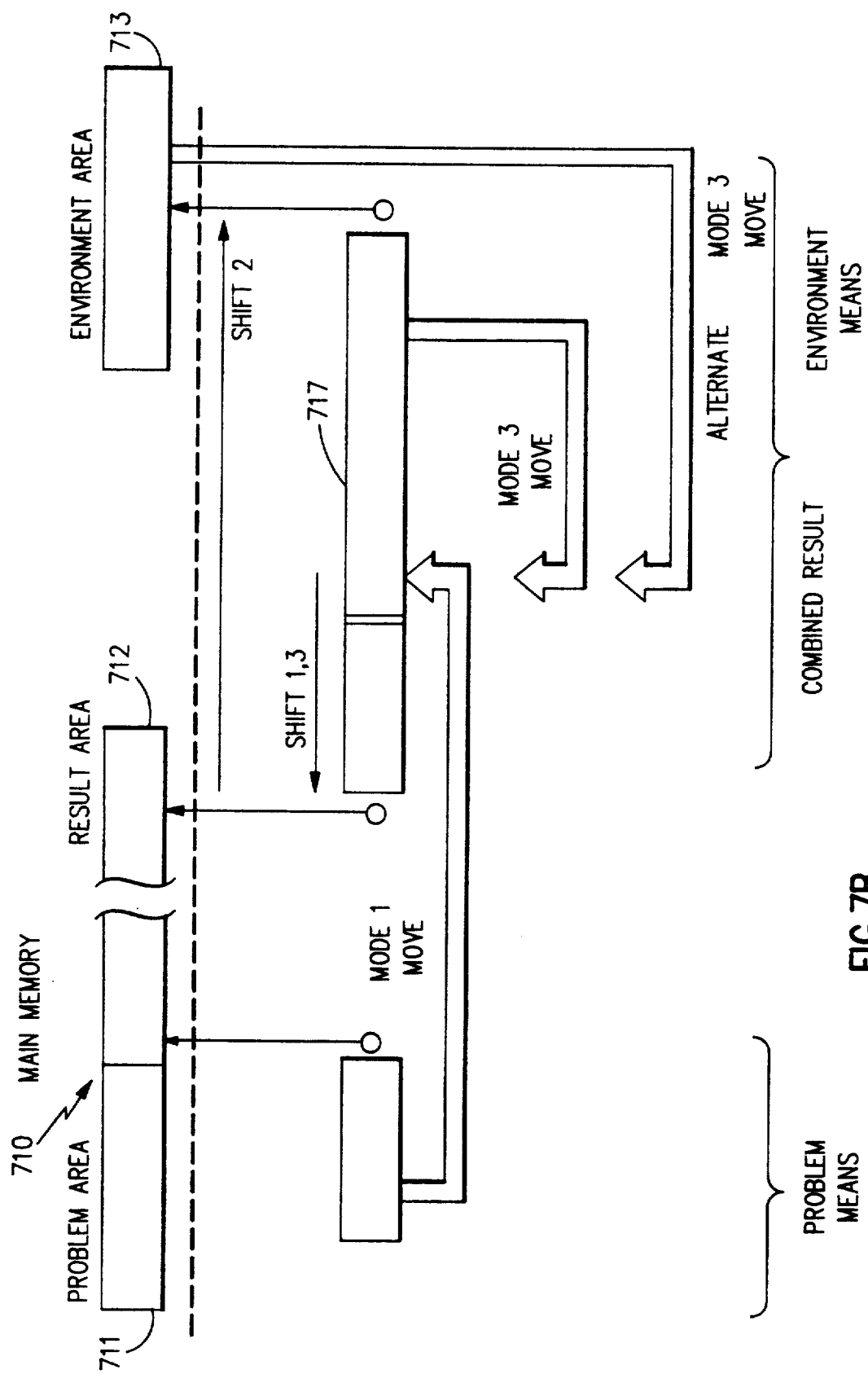
FIG. 7b is a representation of memory and data flow of a third embodiment of the lambda calculus computing machine.

FIG. 7B shows a representation of main memory and pipeline memory, and data flow therebetween, for the third embodiment. In the third embodiment, the buffer register groups 717 associated with result register set R 137 and environment register set E 134 have forward and reverse shift capability. This capability is well known in the relevant art and will not be described or shown in detail. As shown in FIG. 7B, the buffer register groups associated with result register set R and environment register set E are adjoined. Mode one (1) and mode three (3) moves require actual transfers of register contents to the buffer groups associated with result register set R and environment register set E. A mode two (2) move is accomplished by accessing locations in the buffer register group associated with the result register set R, progressively to the left (as many times as prescribed by the number of lambdas in the problem area), or by shifting the contents of the buffer register group to the right, as shown in FIG. 7B.

Such an arrangement combines many single mode two (2) moves into one action thus further maximizing processing speed.

While this invention has been described in the specification and illustrated in the drawings with reference to a preferred embodiment, it will be understood by those skilled in the art that various changes may be made and equivalents may be substituted for elements of the invention without departing from the scope of the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A computer including an input unit, an arithmetic-logic unit, a memory unit, a control unit, an output unit, and signal means connected to each of said units to permit signal communication between each of said units, wherein said input unit comprises means for encoding a plurality of source elements into a plurality of respective binary words, each of said source elements being one of a plurality of element-types, including a lambda, an application, and a variable type, said plurality of source elements representing a problem expression in graph form, and means for loading said binary words into respective storage locations in said memory unit, said output unit comprises means for retrieving stored binary words from said memory unit and means for decoding said retrieved binary words for output, and said control unit comprises, problem means, coupled to said memory unit, for fetching the binary encoded source elements of said problem expression from said memory unit, means, coupled to said problem means, for generating a result expression from at least one of the source elements of said problem expression, means, coupled to said generating means and said memory unit, for storing said result expression into contiguous locations of a result area of said memory unit, said result expression comprising a plurality of address pointers to pre-identified source elements of said problem expression, result means, coupled to said memory unit, for fetching said result expression from the result area of said memory unit, means, coupled to said result means and said memory unit, for writing said result expression into contiguous locations of a shared environment area of said memory unit, environment means, coupled to said memory unit, for fetching said result expression from the environment area of said memory unit, and means, coupled to said memory unit, for comparing at least one storage location from the result area of said memory unit with at least one storage location from the environment area of said memory unit to monitor the storage capacity of the result area and the environment area, means to operate said computer in at least three basic modes, that further include a first mode, wherein said problem expression is read from said memory unit, a result expression is generated therefrom and said result expression is written into said result area of said memory unit as a plurality of address pointers, said computer operating in said first mode until said problem means fetches either a lambda or a variable type source element, upon detection of a lambda type source element, a second mode, wherein said result expression is read from said result area of said memory unit and written into said environment area of said memory unit, said computer operating in said second mode until a predetermined number of binary words are written into the environment area, after which said computer switches back into said first mode, upon detection of a variable type source element, a third mode, wherein the variable type source element operates as an index into the environment area of said memory unit, said environment area being accessed by said computer and an address location in said memory unit computed where a pointer to an argument expression is stored.

2. A computer as recited in claim 1, wherein said problem means, said result means, and said environment means are configured as a plurality of instruction counters capable of being switched from an incremental mode of counting to a decremental mode of counting and a plurality of instruction decoders capable of being switched from a sequential reading mode to a sequential writing mode, each of said instruction counters and said instruction decoders being switched in accordance with instructions read, and being capable of operating in single steps and multiple steps in response to signals transmitting the contents of registers said instruction counters and said instruction decoders set, said instruction counters and said instruction decoders being further interconnected and cooperating with each another when said computer generates a lambda expression in the result area from a lambda expression in the problem area.

3. A computer as recited in claim 1, wherein said control unit further comprises a pipeline memory unit coupled to said storing means and to said result means, for buffering said result expression.

4. A computer as recited in claim 3, wherein said result means further comprises means for generating address pointers that are associated with said result expression that has been written into said environment area, said address pointers point to storage locations in said pipeline memory unit.

5. A method of computing based on lambda calculus theory, utilizing a conventional computer that includes an input unit, an arithmetic-logic unit, a memory unit, a control unit, an output unit, and signal means connected to each of said units to permit signal communication between each of said units, comprising the steps of sequentially instructing said computer to encode a plurality of source elements into a plurality of binary words, each of said source elements being one of a plurality of element types including a lambda, an application, and a variable type, said plurality of source elements representing a problem expression in graph form, instructing said computer to load said binary words into respective storage locations in said memory unit, instructing said computer to fetch the binary encoded source elements of said problem expression from said memory unit, instructing said computer to generate a result expression from at least one of the source elements of said problem expression, instructing said computer to store said result expression into a result area of said memory unit, said result expression comprising a plurality of address pointers to pre-identified source elements of said problem expression, instructing said computer to fetch said result expression from the result area of said memory unit, instructing said computer to write said result expression into a shared environment area of said memory unit, instructing said computer to recursively perform head order reduction on said result expression to obtain a binary encoded normal form that is stored in said memory unit, instructing said computer to compare in parallel at least one storage location from the result area of said memory unit with at least one storage location from the environment area of said memory unit to monitor the storage capacity of the result area and the environment area.

6. A method as recited in claim 5, further comprising the steps of sequentially instructing said computer to retrieve said binary encoded normal form from said memory unit, instructing said computer to decode said binary encoded normal form into decoded text, and instructing said computer to present said decoded text for output.

7. A computer including an input unit, an arithmetic logic unit, a control unit, an output unit, and a signal means connected to each of said units to permit signal communication between each of said units, wherein said input unit comprises means for encoding a plurality of source elements into a plurality of respective binary words, each of said source elements being one of a plurality of element types, including a lambda, an application, and a variable type, said plurality of source elements representing a problem expression in graph form, and means for loading said binary words into contiguous storage locations in said memory unit, said control unit comprises, problem means, coupled said memory unit, for fetching the binary encoded source elements of said problem expression from said memory unit, generating means, coupled to said problem means, for performing head order reduction on said binary encoded source elements of said problem expression, said generating means further including means for sensing the identities of said binary encoded source elements of said problem expression, first register means for accessing an environment containing closures within said problem expression, second register means for holding a binding index to said variable types within said problem expression, means, coupled to said generating means and said memory unit, for storing elements of said problem expression into contiguous locations of a result area of said memory unit to form a partial result expression that may have mutually independent pending arguments, result means, coupled to said memory unit, for writing elements of said partial result expression into contiguous locations of an environment area of said memory unit to form environments that may be shared by said pending arguments of said partial result expression, environment means, coupled to said second generating means and said memory unit, for fetching elements of said partial result expression from said environment area of said memory unit as may be needed to further reduce said pending arguments of said partial result expression, said environment means further including third and fourth register means, said generating means being coupled to said result means, said environment means and said memory unit, whereby said pending arguments of said partial result expression are further reduced to produce a binary encoded transformed result expression in head normal form that is stored in contiguous locations of said result area, said transformed result expression further comprising a plurality of address pointers to pre-identified source elements of said problem expression, free monitor register means, coupled to said memory unit for comparing at least one storage location from the result area of said memory unit with at least one storage location from the environment area of said memory unit for monitoring the storage capacity of the result area and the environment area, and said output unit comprises means for retrieving said binary encoded transformed result expression from said memory unit and means for decoding said retrieved binary words for output.

8. The apparatus of claim 7 wherein said control unit further comprises a pipeline unit coupled to said memory unit that is capable of buffering elements that are fetched from said memory unit and stored in said memory unit.

9. The apparatus of claim 7 wherein said signal means comprises a signal bus system.

10. The apparatus of claim 8 wherein said control unit further includes means for generating address pointers that are associated with said result expression, said address pointers pointing to storage locations in said pipeline unit and being stored in said environment area, whereby data that is transferred between from said result area to said environment area can be fetched from said pipeline unit.

11. A method of computing utilizing programs written in an applicative language containing variables that implements lambda calculus, comprising the steps of introducing the text of a program written in said language into a conventional computer that includes an input unit, an arithmetic-logic unit, a memory unit, a control unit, an output unit, and a signal means connected to each of said units to permit signal communication between each of said units, said program having problem expressions comprising a plurality of source elements, each of said source elements being one of a plurality of element-types, including a lambda, an application, and a variable type, said problem expressions being representable in graph form, performing head order reduction on said problem expressions, said reduction comprising the steps of sequentially instructing said computer to encode said source elements into a plurality of respective binary words, instructing said computer to load said binary words into respective storage locations in said memory unit, instructing said computer to fetch the binary encoded source elements of said problem expression from said memory unit, instructing said computer to sense the identities of said binary encoded source elements of said problem expression, instructing said computer to identify and decode closures within said problem expression, instructing said computer to assign a binding index to said variable types within said problem expression, instructing said computer to store elements of said problem expression into contiguous locations of a result area of said memory unit to form a partial result expression that may have mutually independent pending argument closures, instructing said computer to write elements of said partial result expression into contiguous locations of an environment area of said memory unit to form an environment that is shared by said pending argument closures of said partial result expression, instructing said computer to fetch elements of said partial result expression from said environment area of said memory unit as may be needed to further reduce said pending arguments of said partial result expression to produce a transformed result expression in normal form, instructing said computer to monitor the storage capacity of the result area and the environment area, further comprising the step of comparing at least one storage location from the result area of said memory unit with at least one storage location from the environment area of said memory unit, instructing said computer to store said transformed result expression in a binary encoded form in contiguous locations of said result area, said binary encoded transformed result expression further comprising a plurality of address pointers to pre-identified source elements of said problem expression, submitting said binary encoded transformed result expression to a von Neumann processor that is coupled to said memory unit, instructing said von Neumann processor to retrieve source elements of said problem expression that are referenced by said binary encoded transformed result expression, wherein said von Neumann processor is capable of operating on said source elements in accordance with said applicative language to execute said program.

12. The apparatus of claim 1 wherein said signal means comprises a signal bus system.

* * * * *